(12) United States Patent
Sterbenz et al.

(10) Patent No.: US 12,257,818 B2
(45) Date of Patent: *Mar. 25, 2025

(54) USES OF MICROBIAL DERIVED MATERIALS IN POLYMER APPLICATIONS

(71) Applicant: Checkerspot, Inc., Alameda, CA (US)

(72) Inventors: Matthew Sterbenz, Salt Lake City, UT (US); Daniel Malmrose, Salt Lake City, UT (US); Scott Franklin, Woodside, CA (US)

(73) Assignee: Checkerspot, Inc., Alameda, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/317,748

(22) Filed: May 15, 2023

(65) Prior Publication Data

US 2023/0364883 A1 Nov. 16, 2023

Related U.S. Application Data

(63) Continuation of application No. 17/840,989, filed on Jun. 15, 2022, now Pat. No. 11,691,382, which is a continuation of application No. PCT/US2020/065614, filed on Dec. 17, 2020.

(60) Provisional application No. 62/965,599, filed on Jan. 24, 2020, provisional application No. 62/949,903, filed on Dec. 18, 2019.

(51) Int. Cl.
*B32B 5/18* (2006.01)
*B32B 21/04* (2006.01)
*C08G 18/42* (2006.01)

(52) U.S. Cl.
CPC .............. *B32B 5/18* (2013.01); *B32B 21/047* (2013.01); *C08G 18/42* (2013.01)

(58) Field of Classification Search
CPC ..... B32B 21/047; B32B 5/18; C08G 18/4018; C08G 18/42; C08G 18/4288; C08G 18/4829; C08G 18/7664; C08G 2110/00; C09D 175/04; C09J 175/04
See application file for complete search history.

(56) References Cited

U.S. PATENT DOCUMENTS

| 4,248,802 A | 2/1981 | Kuntz |
| 4,483,802 A | 11/1984 | Gartner et al. |
| RE31,812 E | 1/1985 | Kuntz |
| 4,545,597 A | 10/1985 | Meatto et al. |

(Continued)

FOREIGN PATENT DOCUMENTS

| DE | 202006018792 U1 | 4/2008 |
| JP | 2011516634 A | 5/2011 |

(Continued)

OTHER PUBLICATIONS

Co-pending U.S. Appl. No. 18/156,929, inventors Parker; Leon et al., filed Jan. 19, 2023.

(Continued)

*Primary Examiner* — Frances Tischler
(74) *Attorney, Agent, or Firm* — Banner & Witcoff, Ltd.

(57) ABSTRACT

This disclosure provides methods for the chemical modification of microbial derived triglyceride oils, use thereof in polyurethane chemistries, and incorporation thereof as a core material alone or as part of a wood core composite in the production of sporting goods equipment, including, for example, alpine skis, touring skis, cross country skis, approach skis, split boards, snowboards, and water skis.

22 Claims, 22 Drawing Sheets

(56) References Cited

U.S. PATENT DOCUMENTS

| | | |
|---|---|---|
| 4,545,941 A | 10/1985 | Rosenburg |
| 4,556,237 A | 12/1985 | Meatto et al. |
| 5,544,908 A | 8/1996 | Fezio |
| 5,759,664 A | 6/1998 | Chisnell et al. |
| 6,107,433 A | 8/2000 | Petrovic et al. |
| 6,180,686 B1 | 1/2001 | Kurth et al. |
| 6,414,172 B1 | 7/2002 | Garces et al. |
| 7,153,576 B2 | 12/2006 | Wang et al. |
| 7,331,835 B2 | 2/2008 | Renard et al. |
| 7,883,882 B2 | 2/2011 | Franklin et al. |
| 7,935,515 B2 | 5/2011 | Franklin et al. |
| 8,075,452 B2 | 12/2011 | Isaacson et al. |
| 8,187,860 B2 | 5/2012 | Franklin et al. |
| 8,222,010 B2 | 7/2012 | Franklin et al. |
| 8,268,610 B2 | 9/2012 | Franklin et al. |
| 8,435,767 B2 | 5/2013 | Franklin et al. |
| 8,450,083 B2 | 5/2013 | Day et al. |
| 8,476,059 B2 | 7/2013 | Trimbur et al. |
| 8,497,116 B2 | 7/2013 | Trimbur et al. |
| 8,512,999 B2 | 8/2013 | Trimbur et al. |
| 8,518,689 B2 | 8/2013 | Trimbur et al. |
| 8,535,794 B2 | 9/2013 | Brauers et al. |
| 8,545,960 B2 | 10/2013 | McGuire, Jr. et al. |
| 8,557,249 B2 | 10/2013 | Brooks et al. |
| 8,592,188 B2 | 11/2013 | Franklin et al. |
| 8,633,012 B2 | 1/2014 | Franklin et al. |
| 8,647,397 B2 | 2/2014 | Trimbur et al. |
| 8,674,180 B2 | 3/2014 | Franklin et al. |
| 8,697,402 B2 | 4/2014 | Trimbur et al. |
| 8,697,427 B2 | 4/2014 | Franklin et al. |
| 8,765,424 B2 | 7/2014 | Franklin et al. |
| 8,772,575 B2 | 7/2014 | Franklin et al. |
| 8,790,914 B2 | 7/2014 | Trimbur et al. |
| 8,802,422 B2 | 8/2014 | Trimbur et al. |
| 8,808,485 B2 | 8/2014 | James et al. |
| 8,822,176 B2 | 9/2014 | Day et al. |
| 8,822,177 B2 | 9/2014 | Day et al. |
| 8,846,375 B2 | 9/2014 | Franklin et al. |
| 8,852,885 B2 | 10/2014 | Franklin et al. |
| 8,871,985 B2 | 10/2014 | Van Vliet et al. |
| 8,889,401 B2 | 11/2014 | Trimbur et al. |
| 8,889,402 B2 | 11/2014 | Trimbur et al. |
| 8,945,908 B2 | 2/2015 | Franklin et al. |
| 8,951,777 B2 | 2/2015 | Franklin et al. |
| 8,957,120 B2 | 2/2015 | Berthevas et al. |
| 9,000,062 B2 | 4/2015 | Albach et al. |
| 9,062,294 B2 | 6/2015 | Franklin et al. |
| 9,066,527 B2 | 6/2015 | Franklin et al. |
| 9,068,213 B2 | 6/2015 | Franklin et al. |
| 9,102,973 B2 | 8/2015 | Franklin et al. |
| 9,109,239 B2 | 8/2015 | Franklin et al. |
| 9,200,307 B2 | 12/2015 | Franklin et al. |
| 9,249,252 B2 | 2/2016 | Ngantung et al. |
| 9,249,436 B2 | 2/2016 | Franklin et al. |
| 9,249,441 B2 | 2/2016 | Franklin et al. |
| 9,255,282 B2 | 2/2016 | Franklin et al. |
| 9,279,136 B2 | 3/2016 | Franklin et al. |
| 9,328,351 B2 | 5/2016 | Franklin et al. |
| 9,353,389 B2 | 5/2016 | Franklin et al. |
| 9,375,703 B2 | 6/2016 | Harlin et al. |
| 9,382,371 B2 | 7/2016 | Van De Braak et al. |
| 9,388,435 B2 | 7/2016 | Franklin et al. |
| 9,493,640 B2 | 11/2016 | Cernohous et al. |
| 9,518,277 B2 | 12/2016 | Franklin et al. |
| 9,551,017 B2 | 1/2017 | Franklin et al. |
| 9,567,615 B2 | 2/2017 | Davis |
| 9,593,351 B2 | 3/2017 | Franklin et al. |
| 9,649,368 B2 | 5/2017 | Franklin et al. |
| 9,657,299 B2 | 5/2017 | Franklin et al. |
| 9,758,757 B2 | 9/2017 | Harlin et al. |
| 9,796,949 B2 | 10/2017 | Dummer et al. |
| 9,909,155 B2 | 3/2018 | Franklin et al. |
| 10,006,034 B2 | 6/2018 | Franklin et al. |
| 10,053,646 B2 | 8/2018 | Schiff-Deb et al. |
| 10,053,715 B2 | 8/2018 | Franklin et al. |
| 10,100,341 B2 | 10/2018 | Franklin et al. |
| 10,125,382 B2 | 11/2018 | Casolari et al. |
| 10,138,435 B2 | 11/2018 | Trimbur et al. |
| 10,167,489 B2 | 1/2019 | Franklin et al. |
| 10,260,076 B2 | 4/2019 | Franklin et al. |
| 10,287,613 B2 | 5/2019 | Franklin et al. |
| 10,316,299 B2 | 6/2019 | Davis et al. |
| 10,344,305 B2 | 7/2019 | Franklin et al. |
| 10,494,068 B2 | 12/2019 | Woo |
| 10,557,114 B2 | 2/2020 | Rudenko et al. |
| 10,683,522 B2 | 6/2020 | Franklin et al. |
| 11,118,134 B2 | 9/2021 | Franklin |
| 11,208,369 B2 | 12/2021 | Petrovic et al. |
| 11,352,602 B2 | 6/2022 | Wee et al. |
| 11,667,870 B2 | 6/2023 | Franklin |
| 11,673,850 B2 | 6/2023 | Petrovic et al. |
| 11,691,382 B2 | 7/2023 | Sterbenz et al. |
| 2004/0241392 A1 | 12/2004 | Sorrentino |
| 2010/0311992 A1 | 12/2010 | Petrovic et al. |
| 2011/0015292 A1 | 1/2011 | Radhakrishnan et al. |
| 2011/0113679 A1 | 5/2011 | Cohen et al. |
| 2011/0256282 A1 | 10/2011 | Piechocki et al. |
| 2012/0073186 A1 | 3/2012 | Knuth et al. |
| 2012/0135479 A1 | 5/2012 | Dillon et al. |
| 2012/0196079 A1 | 8/2012 | Brauers et al. |
| 2013/0323382 A1 | 12/2013 | Franklin et al. |
| 2013/0338385 A1 | 12/2013 | Franklin et al. |
| 2014/0145374 A1 | 5/2014 | Altonen et al. |
| 2014/0178950 A1 | 6/2014 | Franklin et al. |
| 2014/0256600 A1 | 9/2014 | Dillon et al. |
| 2016/0002566 A1 | 1/2016 | Vanhercke et al. |
| 2016/0176800 A1 | 6/2016 | Schiff-Deb et al. |
| 2016/0193793 A1 | 7/2016 | Filippini |
| 2016/0194584 A1 | 7/2016 | Ngantung et al. |
| 2016/0312151 A1 | 10/2016 | Narine et al. |
| 2016/0348119 A1 | 12/2016 | Franklin et al. |
| 2017/0066893 A1 | 3/2017 | Falken |
| 2017/0240253 A1 | 8/2017 | Woo |
| 2018/0127350 A1 | 5/2018 | Hapiot et al. |
| 2018/0163170 A1 | 6/2018 | Wee et al. |
| 2018/0237811 A1 | 8/2018 | Franklin et al. |
| 2019/0276671 A1 | 9/2019 | Zhao et al. |
| 2020/0299968 A1 | 9/2020 | Brandt et al. |
| 2021/0130858 A1 | 5/2021 | Franklin et al. |
| 2021/0244064 A1 | 8/2021 | Brooks et al. |
| 2021/0246434 A1 | 8/2021 | Ko et al. |
| 2022/0119735 A1 | 4/2022 | Franklin |
| 2022/0324198 A1 | 10/2022 | Sterbenz et al. |
| 2022/0356292 A1 | 11/2022 | Sterbenz et al. |
| 2023/0167224 A1 | 6/2023 | Franklin et al. |

FOREIGN PATENT DOCUMENTS

| | | |
|---|---|---|
| JP | 2014500349 A | 1/2014 |
| JP | 2015521033 A | 7/2015 |
| JP | 2018509516 A | 4/2018 |
| WO | WO-2006116456 A1 | 11/2006 |
| WO | WO-2008151149 A2 | 12/2008 |
| WO | WO-2009117665 A2 | 9/2009 |
| WO | WO-2010006032 A1 | 1/2010 |
| WO | WO-2010045368 A2 | 4/2010 |
| WO | WO-2010063031 A2 | 6/2010 |
| WO | WO-2010063032 A2 | 6/2010 |
| WO | WO-2010120923 A1 | 10/2010 |
| WO | WO-2010120939 A2 | 10/2010 |
| WO | WO-2011150410 A2 | 12/2011 |
| WO | WO-2011150411 A1 | 12/2011 |
| WO | WO-2012061647 A2 | 5/2012 |
| WO | WO-2012106560 A1 | 8/2012 |
| WO | WO-2013082186 A2 | 6/2013 |
| WO | WO-2013158938 A1 | 10/2013 |
| WO | WO-2014176515 A2 | 10/2014 |
| WO | WO-2014186395 A1 | 11/2014 |
| WO | WO-2015051319 A2 | 4/2015 |
| WO | WO-2017044882 A1 | 3/2017 |
| WO | WO-2018187329 A1 | 10/2018 |
| WO | WO-2019083910 A1 | 5/2019 |
| WO | WO-2020002098 A1 | 1/2020 |
| WO | WO-2020020545 A1 | 1/2020 |

(56) References Cited

FOREIGN PATENT DOCUMENTS

| | | |
|---|---|---|
| WO | WO-2020047216 A1 | 3/2020 |
| WO | WO-2020121319 A1 | 6/2020 |
| WO | WO-2020167745 A1 | 8/2020 |
| WO | WO-2021127181 A1 | 6/2021 |
| WO | WO-2021150923 A1 | 7/2021 |
| WO | WO-2021247368 A1 | 12/2021 |
| WO | WO-2022221402 A1 | 10/2022 |
| WO | WO-2023043945 A1 | 3/2023 |
| WO | WO-2023091669 A1 | 5/2023 |
| WO | WO-2023102069 A1 | 6/2023 |
| WO | WO-2023196923 A1 | 10/2023 |
| WO | WO-2023212726 A2 | 11/2023 |
| WO | WO-2023212726 A3 | 12/2023 |

OTHER PUBLICATIONS

Co-pending U.S. Appl. No. 18/241,561, inventors Franklin; Scott et al., filed Sep. 1, 2023.

Co-pending U.S. Appl. No. 18/304,085, inventor Franklin; Scott, filed Apr. 20, 2023.

Co-pending U.S. Appl. No. 18/310,329, inventors Petrovic; Zoran et al., filed May 1, 2023.

Co-pending U.S. Appl. No. 18/345,568, inventors Witmer; Garrett et al., filed Jun. 30, 2023.

Co-pending U.S. Appl. No. 18/345,591, inventors Witmer; Garrett et al., filed Jun. 30, 2023.

Co-pending U.S. Appl. No. 18/366,323, inventor Franklin; Scott, filed Aug. 7, 2023.

Co-pending U.S. Appl. No. 18/450,573, inventors Petrovic; Zoran et al., filed Aug. 16, 2023.

U.S. Appl. No. 17/840,989 Notice of Allowance dated Mar. 1, 2023.

U.S. Appl. No. 17/840,989 Office Action dated Nov. 28, 2022.

Co-pending U.S. Appl. No. 18/486,450, inventors Rand; Charles et al., filed Oct. 13, 2023.

Co-pending U.S. Appl. No. 18/501,505, inventors Parker; Leon et al., filed Nov. 3, 2023.

Co-pending U.S. Appl. No. 18/515,988, inventor Franklin; Scott, filed Nov. 21, 2023.

Co-pending U.S. Appl. No. 18/519,816, inventors Petrovic; Zoran et al., filed Nov. 27, 2023.

EP20903068.3 Extended European Search Report dated Nov. 9, 2023.

Szabo et al. Safety evaluation of oleic-rich triglyceride oil produced by a heterotrophic microalgal fermentation process. Food and Chemical Toxicology 65 (2014) 301-311. Available online Jan. 3, 2014.

Acero, Polyurethane foams from renewable and sustainable polyols. Portugal: Instituto Superior Tecnico (2014).

Algae Technology. Arctic Foam. (Webpage.) Retrieved Jun. 28, 2022 at URL: http://arcticfoam.us/algae-technology/ . 5 pages.

Barrett. The First Skis Made From Algae Bioplastics. Bioplastic News (Jul. 9, 2019). Retrieved Jun. 17, 2022 at URL: https://bioplasticsnews.com/2019/07/09/algae-bioplastics-skis/ . 8 pages.

Catino. The Green Ski Revolution: Matt Sterbenz launches the WNDR Alpine ski brand. Freeskier.com. Originally accessed Jan. 2, 2020. Copy retrieved Jun. 17, 2022 at URL: https://freeskier.com/stories/the-green-ski-revolution-matt-sterbenz-launches-the-wnder-alpine-ski-brand . 7 pages.

Co-pending U.S. Appl. No. 17/396,876, inventor Franklin; Scott, filed Aug. 9, 2021.

Cortijo Martin. Algae, innovating the future, My Chemical Monitoring (http://www.mychemicalmonitoring.eu ) (Sep. 10, 2015). Retrieved Jun. 16, 2022 at URL: https://chemycal.com/news/a41b8da7-e7c5-432a-a6d1-dda9a2d8a603/Algae_innovating_the_future . 4 pages.

EP19855071.7 Extended European Search Report dated May 6, 2022.

Hang Ten: Catch Waves with an Algae-Based Surfboard. Office of Energy Efficiency & Renewable Energy, U.S. Department of Energy. Web page (Jul. 3, 2017). Retrieved Jun. 17, 2022 at URL: https://www.energy.gov/eere/articles/hang-ten-catch-waves-algae-based-surfboard . 5 pages.

Kennedy. Is This the Future of Surfing? These Guys Have Just Made a Surfboard Out of Pond Slime . . . Mpora (Apr. 28, 2015). Retrieved Jun. 17, 2022 at URL: https://mpora.com/surfing/guys-just-built-surfboard-made-algae/ . 5 pages.

Lin et al. Genetic engineering of microorganisms for biodiesel production. Bioengineered. Sep. 1, 2013; 4(5): 292-304. Published online Dec. 6, 2012. doi: 10.4161/bioe.23114.

Machine translation of DE 202006018792, University of Hamburg (Apr. 10, 2008).

McDonald. Surfing into a Greener Future. UC San Diego News Center. Apr. 23, 2015. 4 pages. URL: https://ucsdnews.ucsd.edu/feature/surfing_into_a_greener_future .

Patel et al. High conversion and productive catalyst turnovers in cross-metathesis reactions of natural oils with 2-butene. Green Chemistry, vol. 8, No. 5, pp. 450-454 (2006). First published online Mar. 22, 2006. DOI: https://doi.org/10.1039/B600956E .

PCT/US2019/048751 International Search Report and Written Opinion dated Dec. 31, 2019.

PCT/US2020/017634 International Search Report and Written Opinion dated Jul. 7, 2020.

PCT/US2020/065614 International Search Report and Written Opinion dated Mar. 10, 2021.

Petrović et al. Polyols and Polyurethanes from Crude Algal Oil. Journal of the American Oil Chemists' Society, vol. 90, Issue 7, pp. 1073-1078 (Jul. 2013). First published Apr. 18, 2013. doi: https://doi.org/10.1007/s11746-013-2245-9.

Petrović. Polyurethanes from Vegetable Oils. Polymer Reviews 48:109-155 (2008).

Schwartz. This Is the First Surfboard Made From Algae, No Petroleum Required. Fast Company (May 13, 2015). Retrieved Jun. 16, 2022 at URL: https://www.fastcompany.com/3046088/this-is-the-first-surfboard-made-from-algae-no-petroleum-required . 4 pages.

Shi et al. Metabolic Engineering of Oleaginous Yeasts for Production of Fuels and Chemicals. Front Microbiol. 2017; 8: 2185. Published online Nov. 8, 2017. doi: 10.3389/fmich.2017.02185. 16 pages.

Tullo. Checkerspot: Targeting materials with tailored algal oils. In C&EN's 2018 10 Start-Ups to Watch, C&EN Chemical & Engineering News (Nov. 5, 2018). Retrieved Jun. 16, 2022 at URL: https://cen.acs.org/business/start-ups/10-Start-Ups-Watch/96/i44?fbclid=IwAR1mNds6jj4eqgihhzTkpkMizaysGWFZhwOnjq2flW0vViG4uhSvoLqfz-I . 4 pages.

Uprety et al. Utilization of microbial oil obtained from crude glycerol for the production of polyol and its subsequent conversion to polyurethane foams. Bioresour Technol. Jul. 2017;235:309-315. doi: 10.1016/j.biortech.2017.03.126. Epub Mar. 24, 2017.

U.S. Appl. No. 17/185,368 Notice of Allowance dated Oct. 6, 2021.

U.S. Appl. No. 17/185,368 Office Action dated Aug. 18, 2021.

Zhang et al. Bio-based Polyurethane Foam Made from Compatible Blends of Vegetable-Oil-based Polyol and Petroleum-based Polyol. ACS Sustainable Chem Eng 3:743-749 (Mar. 6, 2015).

*Side View*

Tail Height — Waist Height — Tip Height

*Profile View*

Tail Width — Waist Width — Tip Width

USES OF MICROBIAL DERIVED MATERIALS IN POLYMER APPLICATIONS

CROSS-REFERENCE

This application is a continuation of U.S. application Ser. No. 17/840,989, filed Jun. 15, 2022, now U.S. Pat. No. 11,691,382, which is a continuation of International Application No. PCT/US2020/065614, filed Dec. 17, 2020, which claims the benefit of U.S. Provisional Application No. 62/965,599, filed Jan. 24, 2020, and U.S. Provisional Application No. 62/949,903, filed Dec. 18, 2019, each of which is incorporated herein by reference in its entirety.

BACKGROUND

Polyurethanes (PU) can be produced via the condensation of a hydroxyl functionality, such as a polyol, with an isocyanate moiety. As a polymer class, PUs are quite diverse and unique among plastics as the chemical structure of PUs is not a highly repetitive unit. As a consequence, PUs having the same general physical properties can have dramatically different chemical compositions. Because of their diverse structural makeup, PUs come in myriad forms and are used for the production of films, coatings, hard and soft foams, sealants, adhesives, and elastomers.

Most polyols are typically derived from petroleum feedstocks. However, as the global climate continues to warm, and with little doubt remaining as to the direct correlation between the increased utilization of fossil fuels over the past millennium and the imminent threat posed by a warming climate, there is an urgent need to replace incumbent, petroleum derived fuels and chemicals with more sustainable, renewable materials.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY

In some aspects, the present disclosure provides a composition comprising: a polyurethane foam; and one or more species of wood, wherein the polyurethane foam is laminated to the one or more species of wood, wherein the composition has a specific strength at yield of about 0.5 MPa/kg·m$^3$ to about 2 MPa/kg·m$^3$.

In some aspects, the present disclosure provides a composition comprising: a polyurethane foam; one or more species of wood; and a polyurethane based adhesive, wherein the polyurethane foam is laminated to the one or more species of wood using the polyurethane based adhesive.

In some aspects, the present disclosure provides a composite composition comprising: a polyurethane derived from a microbial oil polyol; and a solid material.

In some aspects, the present disclosure provides a composition of a sporting goods equipment comprising a core comprising: a polyurethane derived from a microbial oil polyol; and a solid material.

In some aspects, the present disclosure provides a sporting goods equipment comprising a core comprising: a polyurethane derived from a microbial oil polyol; and a solid material.

In some aspects, the present disclosure provides a method of producing a composite composition, comprising: (a) polymerizing a polyol derived from a microbial oil with an isocyanate and a blowing agent, thereby generating a polyurethane foam; and (b) combining the polyurethane foam with a solid material, thereby generating the composite composition.

In some aspects, the present disclosure provides a method of producing a sporting goods equipment or a component thereof, comprising: (a) polymerizing a polyol derived from a microbial oil with an isocyanate and a blowing agent, thereby generating a polyurethane foam; and (b) incorporating the polyurethane foam as a core material to produce the sporting goods equipment or the component thereof.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
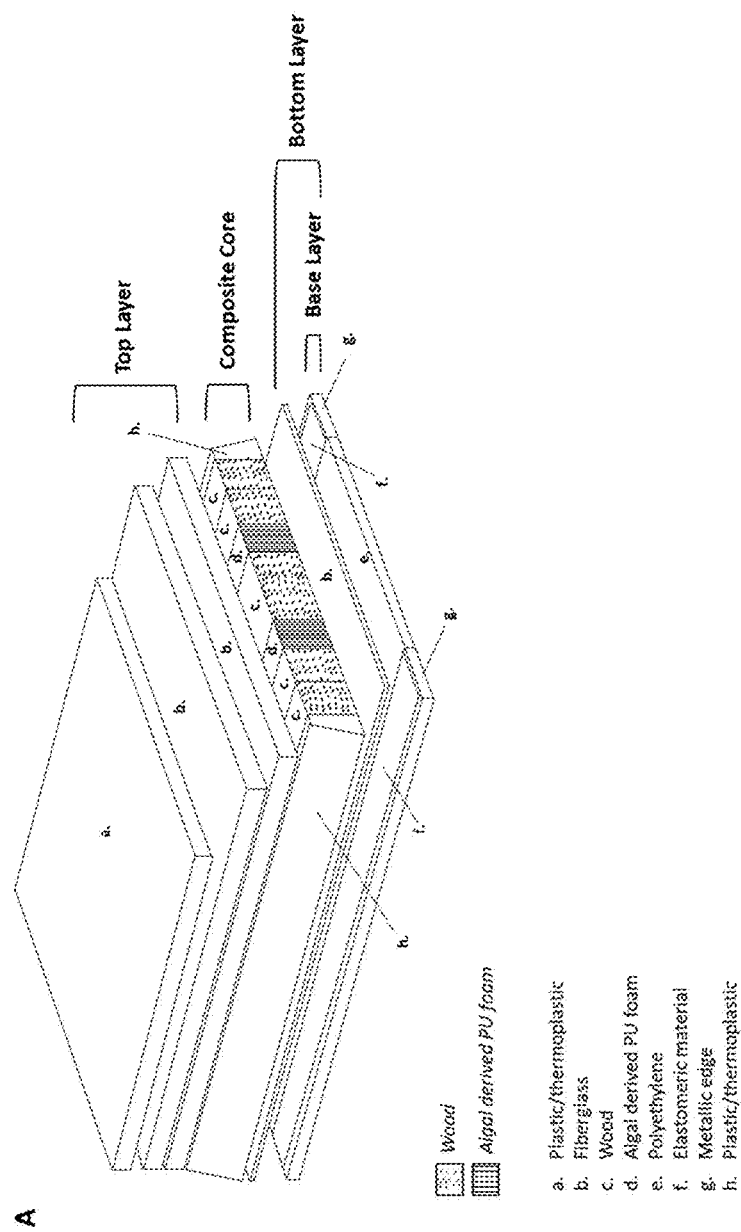
FIG. 1, Panel A illustrates a cutaway view of the sandwich construction of a ski, including an example algal PU composite core as well as additional materials of construction. Panel B illustrates a top view of an example algal PU composite core alone, without the additional materials of construction. Panel C illustrates a cross sectional view of algal PU composite core as shown in Panel B alone, without the additional materials of construction. Panel D illustrates an example ski contour design. Panel E illustrates the ski contour design as shown in Panel D, overlaid on an algal PU composite core. Panel F illustrates a second ski contour design. Panel G illustrates the ski contour design as shown in Panel F, overlaid on an algal PU composite core. Panel H illustrates a side view of algal PU composite cores shown in Panels E and G. Panel I illustrates side and top profile views of a ski contour as depicted in Panels D and E. Panel J illustrates cross sectional views at the tip, waist, and tail of the ski shown in Panel I.
Figure 1:
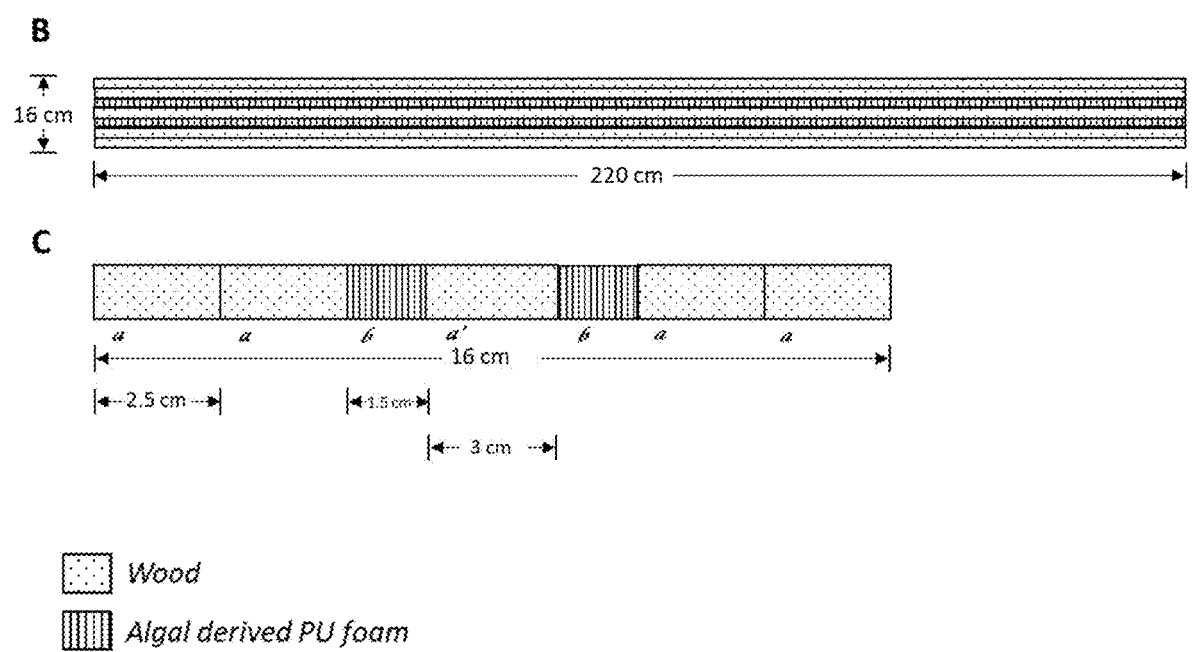
Figure 1:
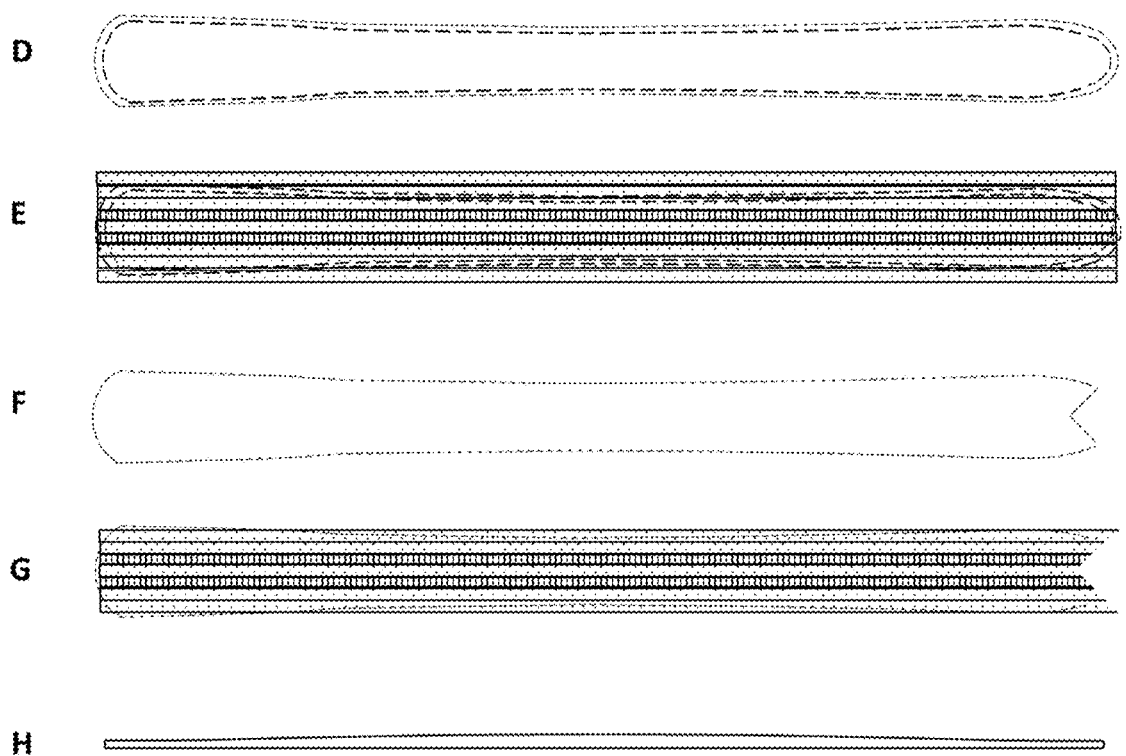
Figure 1:
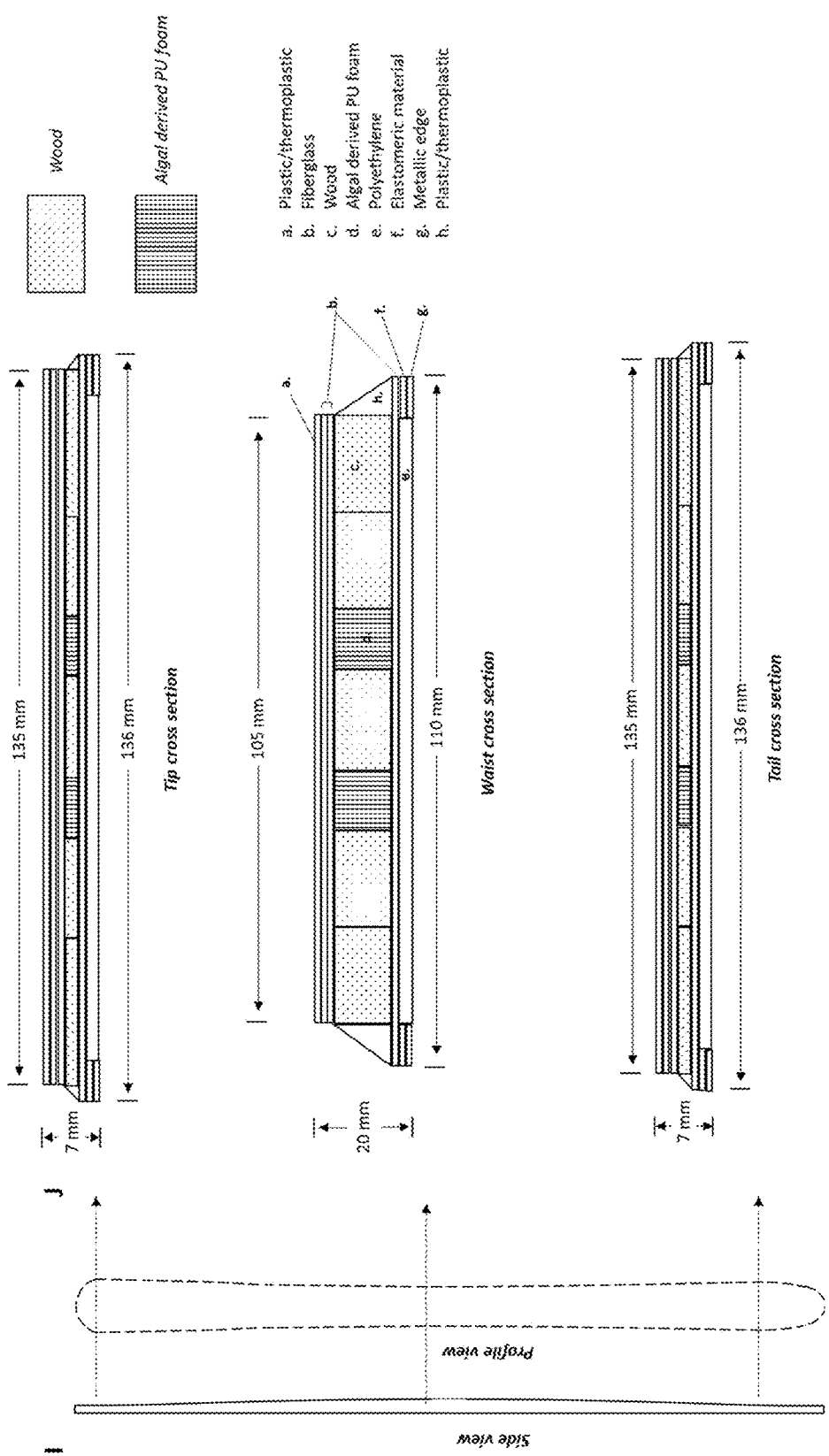

Disclosed herein are wood based composites comprising wood and a wood replacement material used as a means of lightweighting the wood. The wood replacement material can be a renewable, bio-based material having superior strength-to-weight ratio and flexural strength. For example, the wood replacement material is a PU foam. Wood composites described herein can be in the form of a laminate, a plank, a strip, or any composite configuration suitable for the application thereof. These wood composite materials have wide applications where lightweighting and enhancement of strength-to-weight ratio is important, for example, in construction, as both insulation and structural materials, in the construction of lightweight and durable furniture, countertops, and cabinets, as well as in the construction of sporting goods equipment.

Further disclosed herein are methods for generating polyols from microbial derived oils having some degree of unsaturation. These polyols can subsequently be reacted with an isocyanate and a blowing agent to generate a PU foam. The PU foams can be used alone or in combination with one or more species of wood (i.e., in the form of wood-foam composites) as the core material of sporting goods equipment including, for example, skis, alpine skis, touring skis, cross country skis, approach skis, skateboards, kiteboards, split boards, wakeboards, surfboards, paddleboards, snowboards, or water skis.

As used herein, the term "hydroformylated" or "hydroformylation" generally refers to the sequential chemical reactions of hydroformylation (across carbon-carbon double bonds) to produce an aldehyde, followed by hydrogenation (of the resulting aldehyde) to produce an alcohol unless indicated otherwise.

As used herein, the term "triacylglycerol", "triglyceride", or "TAG" refers to esters between glycerol and three saturated and/or unsaturated fatty acids. Generally, fatty acids comprising TAGs have chain lengths of at least 8 carbon atoms up to 24 carbons or more.

As used herein, the term "bio-based" generally refers to materials sourced from biological products or renewable agricultural material, including plant, animal, and marine materials, forestry materials, or an intermediate feedstock.

As used herein, the term "% bio-based carbon" generally refers to the percentage carbon from natural, bio-based (plant or animal by-product) sources versus synthetic (petrochemical) sources. A bio-based carbon content of 100% indicates that a material is entirely sourced from plants or animal by-products, and a bio-based carbon content of 0% indicates that a material does not contain any carbon from plants or animal. A value in between represents a mixture of natural and fossil sources.

As used herein, the term "microbial oil" refers to an oil extracted from a microbe, e.g., an oleaginous, single-celled, eukaryotic or prokaryotic microorganism, including, but not limited to, yeast, microalgae, and bacteria.

As used herein, the term "polyol", "biopolyol", "natural oil polyol", or "NOP" generally refers to triglycerols or fatty acid alcohols comprising hydroxyl functional groups.

As used herein, the term "polyurethane", "PU", or "urethane" generally refers to a class of polymers comprised of carbamate (urethane) linkages formed between a polyol and an isocyanate moiety.

As used herein, the term "TAG purity", "molecular purity", or "oil purity" generally refers to the number of molecular species that make up an oil composition, on an absolute basis or present in amounts above a certain threshold. The fewer the number of TAG species in an oil, the greater the "purity" of the oil. In some embodiments, a pure oil may be an oil comprising up to 9 TAG species and 60% or more of triolein. In some embodiments, a pure oil may be an oil 80% or more of triolein. In some embodiments, a pure oil may comprise up to 4 TAG species present in amounts of above a certain threshold in the oil (e.g., ruling out trace amounts of other TAG) and 90% or more of a single TAG species, such as triolein.

As used herein, the term "blowing agent" generally refers to a substance that produces a gas during the hardening or phase transition of polymers described herein, and as such leads to the formation of a resulting cellular structure.

As used herein, the term "equivalent weight" or "EW" refers to a relative molecular weight (MW) of a polyol. Equivalent weight (EW) can be calculated by 56,100 mg/KOH per mol divided by the OH # of the polyol.

As used herein, the term "strength-to-weight ratio" or "specific strength" generally refers the strength of a material relative to the density of the material. This property can be calculated by the strength of the material divided by the density of the material.

As used herein, the terms "wood-foam" or "foam-wood" composites generally refer to compositions comprising wood and foam. In some embodiments, the composites are constructed by laminating together one or more wood and foam components using an adhesive.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are described herein.

Construction of Skis and Other Sporting Goods Equipment

Skis, snowboards, and other sporting goods equipment are designed and constructed to impart various functional characteristics, including lightweight, strength, strength-to-weight ratio, durability, and flexibility. Heavy skis can be unwieldy and reduce the responsiveness and utility in many applications of these equipment. For example, backcountry skiers or ski mountaineers must ascend on skis using their own locomotion, often for several thousand vertical feet, in difficult terrain to attain sufficient altitude from which to descend. Thus, lightweighting can be a critical factor in the design of high quality and functional ski equipment. Depending on the materials used and manner in which the materials are constructed, a wide array of skis can be produced to suit to many different styles of skiing, different levels of ability, and differing skier preferences.

The core material, in particular, influences all other characteristics of ski behavior and performance. Traditionally, the core of a ski is made of various kinds of wood laminated together. The types of wood species and manner in which the composite components are arranged can further affect the physical properties of the composite. Wood is used as a core material due to its lightweight, strength, and superior flexibility. Wood is also adept at reducing vibration. The dampening property of wood improves stability of the ski. Many other materials may be added to the wood as laminates, depending on the desired behavior and performance of the final product. Non-limiting examples of other materials include foam, carbon fiber, aluminum, fiberglass, titanium, and Kevlar. The core material is surrounded by a top layer and a bottom layer, and reinforced by sidewalls.

The top layer can be composed of layers of plastic and/or fibrous materials, for example, fiberglass.

The bottom layer can be composed of layers of plastic, polyethylene, fiberglass, as well as elastomeric materials. Non-limiting examples of elastomeric materials include polyethylene, rubber, and neoprene. The bottom layer includes a base layer, which can be composed of polyethylene with a metal edge. Non-limiting examples of metals include steel, titanium, aluminum, and an alloy thereof. In some embodiments, the metal edge is composed of steel with a Rockwell Hardness in the range of HRC 45-60. A layer of elastomeric material can sit atop the metal edge, which can help dampen vibrations arising from the metal. In some embodiments, the base layer does not include a metal edge. The sidewall can refer to an area along the edge of a ski above the metal edge that laterally reinforces the core material. FIG. 1, Panel A illustrates a schematic cutaway view of an example ski having a composite core.

The core material can be composed of various materials, including wood, a hydrophobic material overlaid with fiberglass, and an epoxy resin that provides strength and rigidity. In some embodiments, the core material of a sporting goods equipment described herein can be a composite material containing PU and a solid material. The PU can be a PU foam. The composite material can be composed of alternating layers of PU foam and a solid material. A solid material can be a fibrous material, for example, wood, fiberglass, carbon fiber, Kevlar, flax, hemp, or wool.

In some embodiments, the core material is composed of PU foam and one of more species of wood. Wood varieties vary in weight, strength, and flexibility. For example, *Paulownia* is ultra-lightweight, but tends not to dampen vibrations as well as other woods. Beech, maple, ash, and fir, for example, are denser and burlier than other wood types, and thus, provide great torsional rigidity and stability. Solid wood cores made of glue-laminated lamellae are commonly used in ski core equipment. Solid wood cores provide desirable strength and flexural (bending) properties, and come in a variety of types, grains, and densities. Flexural properties are defined as the ability to resist fracture, as described, for example, in ASTM method D790. Lamination of wood planks that differ in density and strength allows for optimization for strength and weight of the lamellae.

Non-limiting examples of wood species include *Paulownia* (for example, *Paulownia* sp.), cherry (for example, *Prunus* sp.), birch (for example, *Betula* sp.), alder (for example, *Alnus* sp.), fuma (for example, *Ceiba* sp.), ash (for example, *Fraxinus* sp.), box elder (for example, *Acer negundo*), chestnut (for example, *Castanea* sp.), elm (for example, *Ulmus* sp.), hickory (for example, *Carya* sp.), koa (for example, *Acacia* sp. and *Acacia koa*), mahogany (for example, *Swietenia* sp.), sweetgum (for example, *Liquidambar* sp.), oak (for example, *Quercus* sp.), ash (for example, *Fraxinus* sp.), aspen (for example, *Populus tremuloides*), beech (for example, *Fagus* sp.), maple (for example, *Acer* sp.), poplar (for example, *Populus* sp.), walnut (for example, *Juglans* sp.), pine (for example, *Pinus* sp.), cedar (for example, *Cedrus* sp. and *Libocedrus* sp.), yew, fir (for example, *Abies* sp.), Douglas fir (for example, *Pseudotsuga menziesii*), larch (for example, *Larix* sp.), hardwood, bamboo (for example, *Bambusoideae* sp.), blackwood, bloodwood, basswood, boxelder, boxwood, brazilwood, coachwood, cocobolo, corkwood, cottonwood, dogwood, ironwood, kingwood, lacewood, marblewood, sandalwood, rosewood, zebrawood, ebony, ivory, buckeye, satinwood, kauri, spruce (for example, *Picea* sp.), cypress (for example, *Taxodium* sp.), hemlock (for example, *Tsuga* sp.), redwood (for example, *Sequoia* sp. and *Sequoiadendron* sp.), rimu, teak (for example, *Tectona* sp.), eucalyptus, and willow (Salix). In some embodiments, the core material is composed of PU foam and *Paulownia*. In some embodiments, the core material comprises PU foam and aspen. In some embodiments, the core material comprises PU foam, *Paulownia*, and aspen.

In some embodiments, the composite material is composed of alternating planks of wood and PU foam that are longitudinally layered along the length of the planks. In some embodiments, the composite material is composed of alternating planks of wood and PU foam that are vertically laminated together. Each plank can be affixed to one another by an adhesive or bonding material. Non-limiting examples of adhesives include a polyvinyl acetate based adhesive, an ethylene vinyl acetate based adhesive, a PU based adhesive, a urea-formaldehyde based adhesive, a melamine based adhesive, and a silicone based adhesive. In some embodiments, the planks of a composite can be laminated together with a resin and/or heat. The resin can be an epoxy resin.

Figure 6:
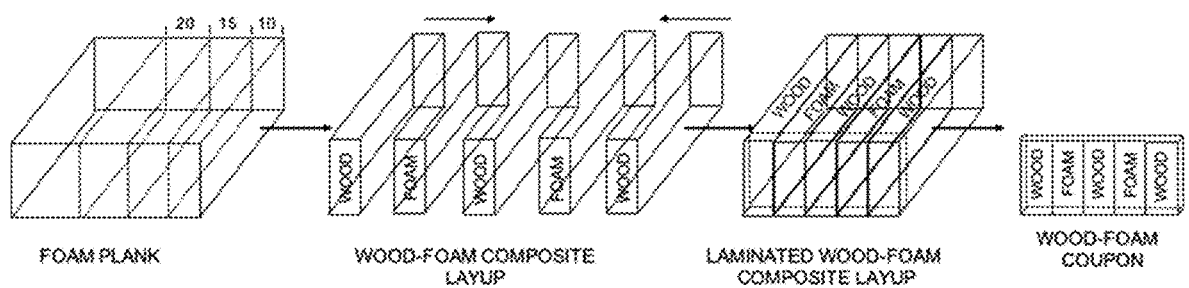
FIG. 6 illustrates a schematic of wood-foam composite layup assembly.

Example wood-foam composite layups can be prepared as outlined in FIG. 6. Foam planks can be prepared and sectioned to various widths. Similarly, wood planks can be prepared and sectioned to various widths, and then combined with the foam planks. The foam planks and wood planks can be arranged in various configurations. The example layup in FIG. 6 shows alternating planks of foam and wood with a center wood plank. In some cases, one or more species of wood can be used. The wood-foam composites can be prepared by lamination of the foam and wood planks using an adhesive.

Sidewalls can provide protection and support to the core of a sporting goods equipment. The sidewall can be composed of a plastic, acrylonitrile butadiene styrene (ABS), PU, polyethylene, rubber, aluminum, wood, or combinations thereof. In some embodiments, the sidewall is composed of PU derived from microbial oil, for example, PU derived from algal oil.

Ski sidewalls can be constructed in various configurations including, for example, cap construction, sandwich construction, half cap construction, and hybrid construction.

Cap construction is where the top layer folds over the edges of the core material. Cap construction can be a lightweighting method by the omission of heavy sidewall materials running along the length of the ski. Sandwich construction involves layering of the top sheets, core material, and bottom sheets such that the integrated product resembles a sandwich configuration. The core material is not covered by the top layers, but instead flanked on each side by a sidewall. In some embodiments, the sidewalls are beveled, for example, top beveled. Sandwich construction can provide increased power transmission to the edge of the ski, and thus, greater flexibility. Half cap (hybrid) construction is a fusion of cap construction and sandwich construction. In this configuration, the top layer folds over the edges of the top half of the core material, including the sidewalls. The bottom half of the core material is uncovered, but flanked on each side by a sidewall. Half cap construction provides the benefit of lightweight and adequate power transmission.

Figure 2:
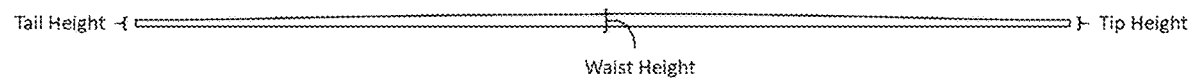
FIG. 2 illustrates side and profile views of the waist, tail, and tip of an example ski.
Figure 2:
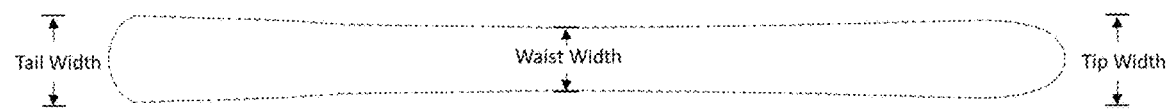

Skis and other similar sporting goods equipment can have various shapes, contours, and profiles that confer specific functional properties. For example, the width and/or height can vary along the length of the ski. FIG. 2 illustrates various dimensions of an example ski, including the waist height, tip height, tail height waist width, tip width, and tail width. Straight lines skis, or skis having the same width along the length, are more stable, but can making turning more difficult.

Figure 3:
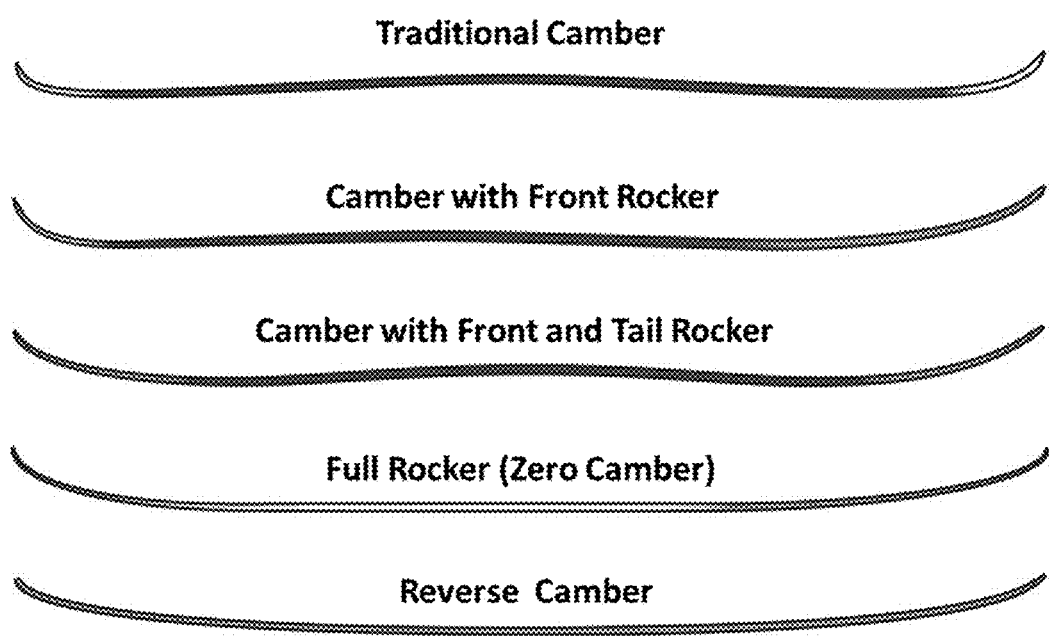
FIG. 3 illustrates examples of ski profiles.

FIG. 3 illustrates example ski profile configurations, including traditional camber (also known as positive camber or full camber), camber with front rocker, camber with front and tail rocker, full rocker, and reverse camber. Camber refers to the curvature of a ski away from a bottom surface or the snow. The tip and tail of the ski touch a flat bottom surface, but the waist of the ski is suspended above the surface. The traditional camber shape maximizes edge contact with snow and confers improved carving capabilities. The reverse design can be built to handle deep snow with ease. This design allows the ski to pivot with less effort from a skier. The tapered extremities illustrated in each example can help eliminate hooking in powder. Rocker can have the opposite curvature of camber in which the ski curves towards the snow. A fully rockered ski can have a flat underfoot and the tip and tail curve upwards away from the snow. This configuration can make the ski more maneuverable and can aid with floatation in deeper powder snow. However, rockered skis can have less edge grip than camber alternatives.

A method of lightweighting ski core compositions is to utilize high density foams prepared from materials, such as polystyrene, PU, and polyvinyl chloride (PVC). These materials can be manufactured in a variety of densities and are typically lighter and less dense compared to wood based counterparts. Like wood, these materials can be laminated to create PU foam composite materials (PU composite lamellae). As such, high density foams can be used to lightweight ski cores while maintaining strength, durability, and flexural properties sufficient for their utility.

From a sustainability and greenhouse gas emissions perspective, however, these materials are not as sustainable as wood. A solution to this conundrum is the use of bio-based raw materials in formulating these polymer materials such as PUs, for example. A PU foam described herein can comprise, be derived from, or be made from a bio-based material, for example, from a microbe, plant, or seed. Skis and other sporting goods equipment described herein are produced from PU foam comprising, derived from, or made from microbial oils. For example, a PU foam described herein comprises, is derived from, or made from a microbial polyol, such as an algal polyol. In some embodiments, a composite material composed of a PU foam derived from microbial oils is used as the core material in a sporting goods equipment or component thereof.

In one aspect, a PU foam described herein has a bio-based carbon content of 30% or more, 40% or more, 50% or more, 60% or more, 70% or more, 80% or more, or 90% or more, as determined by radiocarbon analysis, e.g., using ASTM D6866. For example, a PU foam described herein has a bio-based carbon content of about 40%, about 41%, about 42%, about 43%, about 44%, about 45%, about 46%, about 47%, about 48%, about 49%, or about 50%.

While some examples described herein are directed to applications in ski construction, compositions described herein can also be used in the construction of other sporting goods equipment or components thereof. Non-limiting examples of sporting goods equipment include, for example, a ski, an alpine ski, a touring ski, a cross country ski, an approach ski, a snowboard, a split board, a skateboard, a surfboard, a paddleboard, a wakeboard, a kiteboard, and a water ski.

The precise order, length, and width of components of the composite can be varied to suit the particular needs of the designer. In some embodiments, the composite material can have a length in centimeters (cm) of 50 cm to 250 cm, for example, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, about 100 cm, about 101 cm, about 102 cm, about 103 cm, about 104 cm, about 105 cm, about 106 cm, about 107 cm, about 108 cm, about 109 cm, about 110 cm, about 111 cm, about 112 cm, about 113 cm, about 114 cm, about 115 cm, about 116 cm, about 117 cm, about 118 cm, about 119 cm, about 120 cm, about 121 cm, about 122 cm, about 123 cm, about 124 cm, about 125 cm, about 126 cm, about 127 cm, about 128 cm, about 129 cm, about 130 cm, about 131 cm, about 132 cm, about 133 cm, about 134 cm, about 135 cm, about 136 cm, about 137 cm, about 138 cm, about 139 cm, about 140 cm, about 141 cm, about 142 cm, about 143 cm, about 144 cm, about 145 cm, about 146 cm, about 147 cm, about 148 cm, about 149 cm, about 150 cm, about 151 cm, about 152 cm, about 153 cm, about 154 cm, about 155 cm, about 156 cm, about 157 cm, about 158 cm, about 159 cm, about 160 cm, about 161 cm, about 162 cm, about 163 cm, about 164 cm, about 165 cm, about 166 cm, about 167 cm, about 168 cm, about 169 cm, about 170 cm, about 171 cm, about 172 cm, about 173 cm, about 174 cm, about 175 cm, about 176 cm, about 177 cm, about 178 cm, about 179 cm, about 180 cm, about 181 cm, about 182 cm, about 183 cm, about 184 cm, about 185 cm, about 186 cm, about 187 cm, about 188 cm, about 189 cm, about 190 cm, about 191 cm, about 192 cm, about 193 cm, about 194 cm, about 195 cm, about 196 cm, about 197 cm, about 198 cm, about 199 cm, about 200 cm, about 201 cm, about 202 cm, about 203 cm, about 204 cm, about 205 cm, about 206 cm, about 207 cm, about 208 cm, about 209 cm, about 210 cm, about 211 cm, about 212 cm, about 213 cm, about 214 cm, about 215 cm, about 216 cm, about 217 cm, about 218 cm, about 219 cm, about 220 cm, about 221 cm, about 222 cm, about 223 cm, about 224 cm, about 225 cm, about 226 cm, about 227 cm, about 228 cm, about 229 cm, about 230 cm, about 231 cm, about 232 cm, about 233 cm, about 234 cm, about 235 cm, about 236 cm, about 237 cm, about 238 cm, about 239 cm, about 240 cm, about 241 cm, about 242 cm, about 243 cm, about 244 cm, about 245 cm, about 246 cm, about 247 cm, about 248 cm, about 249 cm, or about 250 cm.

Each layer or plank of the composite material can have a length of 50 cm to 250 cm, for example, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, about 100 cm, about 101 cm, about 102 cm, about 103 cm, about 104 cm, about 105 cm, about 106 cm, about 107 cm, about 108 cm, about 109 cm, about 110 cm, about 111 cm, about 112 cm, about 113 cm, about 114 cm, about 115 cm, about 116 cm, about 117 cm, about 118 cm, about 119 cm, about 120 cm, about 121 cm, about 122 cm, about 123 cm, about 124 cm, about 125 cm, about 126 cm, about 127 cm, about 128 cm, about 129 cm, about 130 cm, about 131 cm, about 132 cm, about 133 cm, about 134 cm, about 135 cm, about 136 cm, about 137 cm, about 138 cm, about 139 cm, about 140 cm, about 141 cm, about 142 cm, about 143 cm, about 144 cm, about 145 cm, about 146 cm, about 147 cm, about 148 cm, about 149 cm, about 150 cm, about 151 cm, about 152 cm, about 153 cm, about 154 cm, about 155 cm, about 156 cm, about 157 cm, about 158 cm, about 159 cm, about 160 cm, about 161 cm, about 162 cm, about 163 cm, about 164 cm, about 165 cm, about 166 cm, about 167 cm, about 168 cm, about 169 cm, about 170 cm, about 171 cm, about 172 cm, about 173 cm, about 174 cm, about 175 cm, about 176 cm, about 177 cm, about 178 cm, about 179 cm, about 180 cm, about 181 cm, about 182 cm, about 183 cm, about 184 cm, about 185 cm, about 186 cm, about 187 cm, about 188 cm, about 189 cm, about 190 cm, about 191 cm, about 192 cm, about 193 cm, about 194 cm, about 195 cm, about 196 cm, about 197 cm, about 198 cm, about 199 cm, about 200 cm, about 201 cm, about 202 cm, about 203 cm, about 204 cm, about 205 cm, about 206 cm, about 207 cm, about 208 cm, about 209 cm, about 210 cm, about 211 cm, about 212 cm, about 213 cm, about 214 cm, about 215 cm, about 216 cm, about 217 cm, about 218 cm, about 219 cm, about 220 cm, about 221 cm, about 222 cm, about 223 cm, about 224 cm, about 225 cm, about 226 cm, about 227 cm, about 228 cm, about 229 cm, about 230 cm, about 231 cm, about 232 cm, about 233 cm, about 234 cm, about 235 cm, about 236 cm, about 237 cm, about 238 cm, about 239 cm, about 240 cm, about 241 cm, about 242 cm, about 243 cm, about 244 cm, about 245 cm, about 246 cm, about 247 cm, about 248 cm, about 249 cm, or about 250 cm.

In some embodiments, the composite material can have a width of 5 cm to 20 cm, for example, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, or about 20 cm.

Each layer or plank of the composite material can have a width of 1 cm to 5 cm, for example, about 1 cm, about 1.5 cm, about 2 cm, about 2.5 cm, about 3 cm, about 3.5 cm, about 4 cm, about 4.5 cm, or about 5 cm.

In some embodiments, the composite material can have a height in millimeters (mm) of 1 mm to 20 mm, for example, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm.

Each layer or plank of the composite material can have a height of 1 mm to 20 mm, for example, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm.

The composite material can be assembled in a mold. A mold can be heated, pressurized, or both. In some embodiments, a composite can be produced in a heated press at a temperature ranging from 50° C. to 100° C., from 50° C. to 60° C., from 60° C. to 70° C., from 70° C. to 80° C., from 80° C. to 90° C., or from 90° C. to 100° C., for example, at about 50° C., at about 60° C., at about 70° C., at about 80° C., at about 90° C., or at about 100° C.

In some embodiments, a composite material can be produced in a pressurized mold ranging from about 20 psi to about 100 psi, from about 20 psi to about 30 psi, from about 30 psi to about 40 psi, from about 40 psi to about 50 psi, from about 50 psi to about 60 psi, from about 60 psi to about 70 psi, or from about 80 psi to about 100 psi, for example, at about 20 psi, at about 30 psi, at about 40 psi, at about 50 psi, at about 60 psi, at about 70 psi, at about 80 psi, at about 90 psi, or at about 100 psi.

In some embodiments, a composite material can be produced by application of heat and/or pressure for duration of about 10 minutes, about 15 minutes, about 20 minutes, about 25 minutes, about 30 minutes, about 35 minutes, about 40 minutes, about 45 minutes, about 50 minutes, about 55 minutes, 60 minutes, about 65 minutes, about 70 minutes, about 75 minutes, about 80 minutes, 85 minutes, 90 minutes, or more.

The precise order, length, and width of components can be varied to confer desired properties of the final product (e.g. a sporting goods equipment). In some embodiments, the sporting goods equipment can have a length in centimeters (cm) of 50 cm to 250 cm, for example, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, about 100 cm, about 101 cm, about 102 cm, about 103 cm, about 104 cm, about 105 cm, about 106 cm, about 107 cm, about 108 cm, about 109 cm, about 110 cm, about 111 cm, about 112 cm, about 113 cm, about 114 cm, about 115 cm, about 116 cm, about 117 cm, about 118 cm, about 119 cm, about 120 cm, about 121 cm, about 122 cm, about 123 cm, about 124 cm, about 125 cm, about 126 cm, about 127 cm, about 128 cm, about 129 cm, about 130 cm, about 131 cm, about 132 cm, about 133 cm, about 134 cm, about 135 cm, about 136 cm, about 137 cm, about 138 cm, about 139 cm, about 140 cm, about 141 cm, about 142 cm, about 143 cm, about 144 cm, about 145 cm, about 146 cm, about 147 cm, about 148 cm, about 149 cm, about 150 cm, about 151 cm, about 152 cm, about 153 cm, about 154 cm, about 155 cm, about 156 cm, about 157 cm, about 158 cm, about 159 cm, about 160 cm, about 161 cm, about 162 cm, about 163 cm, about 164 cm, about 165 cm, about 166 cm, about 167 cm, about 168 cm, about 169 cm, about 170 cm, about 171 cm, about 172 cm, about 173 cm, about 174 cm, about 175 cm, about 176 cm, about 177 cm, about 178 cm, about 179 cm, about 180 cm, about 181 cm, about 182 cm, about 183 cm, about 184 cm, about 185 cm, about 186 cm, about 187 cm, about 188 cm, about 189 cm, about 190 cm, about 191 cm, about 192 cm, about 193 cm, about 194 cm, about 195 cm, about 196 cm, about 197 cm, about 198 cm, about 199 cm, about 200 cm, about 201 cm, about 202 cm, about 203 cm, about 204 cm, about 205 cm, about 206 cm, about 207 cm, about 208 cm, about 209 cm, about 210 cm, about 211 cm, about 212 cm, about 213 cm, about 214 cm, about 215 cm, about 216 cm, about 217 cm, about 218 cm, about 219 cm, about 220 cm, about 221 cm, about 222 cm, about 223 cm, about 224 cm, about 225 cm, about 226 cm, about 227 cm, about 228 cm, about 229 cm, about 230 cm, about 231 cm, about 232 cm, about 233 cm, about 234 cm, about 235 cm, about 236 cm, about 237 cm, about 238 cm, about 239 cm, about 240 cm, about 241 cm, about 242 cm, about 243 cm, about 244 cm, about 245 cm, about 246 cm, about 247 cm, about 248 cm, about 249 cm, or about 250 cm.

In some embodiments, the sporting goods equipment can have a width of 5 cm to 20 cm, for example, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, or about 20 cm. A width can be a waist width, a tip width, or a tail width.

In some embodiments, the sporting goods equipment can have a height of 1 mm to 20 mm, for example, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm. A height can be a waist height, a tip height, or a tail height.

In some embodiments, a ski described herein has a tip width, waist width, and tail width of 136 mm, 110 mm, and 128 mm, respectively. In some embodiments, a ski described herein has a length of 192 cm, 185 cm, 178 cm, or 171 cm.

In some embodiments, a ski described herein has a tip width, waist width, and tail width of 126 mm, 100 mm, and 119 mm, respectively. In some embodiments, a ski described herein has a length of 189 cm, 183 cm, 176 cm, 169 cm, or 162 cm.

In some embodiments, a ski described herein has a tip width, waist width, and tail width of 146 mm, 120 mm, and 143 mm, respectively. In some embodiments, a ski described herein has a length of 191 cm, 184 cm, 177 cm, or 170 cm.

A sporting goods equipment or a component thereof can be assembled in a mold. A mold can be heated, pressurized, or both. In some embodiments, a sporting goods equipment or component thereof can be produced in a heated press at a temperature ranging from 50° C. to 100° C., from 50° C. to 60° C., from 60° C. to 70° C., from 70° C. to 80° C., from 80° C. to 90° C., or from 90° C. to 100° C., for example, at about 50° C., at about 60° C., at about 70° C., at about 80° C., at about 90° C., or at about 100° C.

In some embodiments, a sporting goods equipment or component thereof can be produced in a pressurized mold ranging from about 20 psi to about 100 psi, from about 20 psi to about 30 psi, from about 30 psi to about 40 psi, from about 40 psi to about 50 psi, from about 50 psi to about 60 psi, from about 60 psi to about 70 psi, or from about 80 psi to about 100 psi, for example, at about 20 psi, at about 30 psi, at about 40 psi, at about 50 psi, at about 60 psi, at about 70 psi, at about 80 psi, at about 90 psi, or at about 100 psi.

In some embodiments, a sporting goods equipment or component thereof can be produced by application of heat and/or pressure for duration of about 10 minutes, about 15 minutes, about 20 minutes, about 25 minutes, about 30 minutes, about 35 minutes, about 40 minutes, about 45 minutes, about 50 minutes, about 55 minutes, 60 minutes, about 65 minutes, about 70 minutes, about 75 minutes, about 80 minutes, 85 minutes, 90 minutes, or more.

PU Foam Production

PU foams can be produced by reacting isocyanates and polyols in the presence of catalyst, heat, a linker or chain extender, and other additives. Additives can include surfactants (e.g., silicon surfactants), emulsifiers, stabilizers, property modifiers, performance additives, curatives, release agents, and coloring agents (e.g., color pastes). Additives can be used to achieve specific physical and functional properties of the PU, as well as improve processing, resin stability, cycle times, and overall yields. Physical properties of PU foams can be influenced by the addition of chemical additives during processing. These physical properties include density, strength, and flexural properties, which are critical factors for the application of these foams in consumer products.

Methylene diphenyl diisocyanate (MDI), toluene diisocyanate (TDI), hexamethylene diisocyanate (HDI), isophorone diisocyanate (IPDI), and methyl isocyanate (MIC) are common isocyanates used in the production of PUs. Additional non-limiting examples of isocyanates include Rubinate® 9225, Rubinate® 44, and Rubinate® M. Rubinate® 9225 is a uretonomine-modified pure MDI. Rubinate® 9225 is derived from pure MDI and has been adjusted with a moderate amount of 2,4' isomer to improve stability and maximize physical properties. Rubinate® 9225 can be used as a precursor for prepolymers. Rubinate® 44 is a pure (>98%) 4,4' MDI with a melting point of 38° C. and is solid at room temperature. Rubinate® M isocyanate is a standard polymeric MDI.

Catalysts used for polymerization of polyols and isocyanates to form PUs include, for example, tin catalysts, dibutyl tin dilaurate (DBTDL), dibutyltin diacetate (DBTDA), triethylenediamine (TEDA or Dabco®), dimethylcyclohexylamine (DMCHA), dimethylethanolamine (DMEA), and bis-(2-dimethylaminoethyl)ether (A-99), titanium(IV) isopropoxide, tin carboxylates, bismuth-based catalysts, bismuth carboxylates, zinc carboxylates, zirconium carboxylates, nickel carboxylates, metal carboxylates, and amine catalysts (e.g., JEFFCAT® catalysts (e.g., JEFFCAT® ZF-22)). Catalyst selection can depend on balancing three reactions: urethane (polyol+isocyanate, or gel) formation, urea (water+isocyanate, or "blow") formation, and the isocyanate trimerization reaction. In some embodiments, catalysts are not required for polymerization. For example, heat can be used to accelerate the polymerization reaction.

PU foam production requires a blowing agent (also known as pneumatogen), a substance that creates holes in the foam matrix, thereby providing cellular structure to the foam. Blowing agents can be added in a liquid form during the hardening stage of the foam resulting in the formation of gaseous products and byproducts. Non-limiting examples of chemical blowing agents include isocyanate, water, cyclopentane, pentane, methylformate, dimethoxymethane, azodicarbonamide, hydrazine, and other nitrogen-based materials, and sodium bicarbonate.

In one aspect, a PU foam described herein comprises a polyol, glycerol, a polyether polyol, a silicone based additive, a blowing agent, a PU catalyst, and an isocyanate.

In some embodiments, the polyol is a TAG-derived polyol. In some embodiments, the TAG-derived polyol is a bio-based polyol, for example, a microbial polyol, an algal polyol, a plant polyol, or a seed polyol.

In some embodiments, the polyol is in an amount of about 20% to about 50% or about 20% to about 40% on a weight-by-weight (w/w) basis of the foam. For example, the algal polyol is in an amount of about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50% on a weight-by-weight basis of the foam.

In some embodiments, the glycerol is in an amount of about 1% to about 10% or about 4% to about 9% on a weight-by-weight basis of the foam. For example, the glycerol is in an amount of about 1%, about 1%, about 2%, about 3%, about 4%, about 5%, about 6%, about 7%, about 8%, about 9%, or about 10% on a weight-by-weight basis of the foam.

In some embodiments, the polyether polyol is in an amount of about 1% to about 10% or about 4% to about 5% on a weight-by-weight basis of the foam. For example, the polyether polyol is in an amount of about 1%, about 2%, about 3%, about 4%, about 5%, about 6%, about 7%, about 8%, about 9%, or about 10% on a weight-by-weight basis of the foam. In some embodiments, the foam does not contain a polyether polyol.

In some embodiments, the polyether polyol is an amine polyol, a sucrose polyol, a polypropylene glycol, or a glycerin polyol. In some embodiments, the polyether polyol is a JEFFOL® polyether polyol. Non-limiting examples of JEFFOL® polyether polyols include JEFFOL® PPG-1000 polyol, JEFFOL® PPG-2000 polyol, JEFFOL® PPG-2801 polyol, JEFFOL® PPG-3706 polyol, JEFFOL® FX31-167 polyol, JEFFOL® FX31-240 polyol, JEFFOL® G30-650 polyol, JEFFOL® G31-28 polyol, JEFFOL® G31-35 polyol, JEFFOL® G31-43 polyol, JEFFOL® A-630 polyol, JEFFOL® A-800 polyol, JEFFOL® AD-310 polyol, JEFFOL® AD-500 polyol, JEFFOL® R-350X polyol, JEFFOL® R-425X polyol, JEFFOL® R-470X polyol, JEFFOL® S-490 polyol, JEFFOL® SA-499 polyol, JEFFOL® SD-361 polyol, JEFFOL® SD-441 polyol, JEFFOL® SG-360 polyol, and JEFFOL® SG-522 polyol. In some embodiments, the polyether polyol is JEFFOL® G30-650 polyol.

In some embodiments, the silicone based additive is in an amount of about 0.1% to about 2% or 0.1% to about 1% on a weight-by-weight basis of the foam. For example, the silicone based additive is in an amount of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% on a weight-by-weight basis of the foam. In some embodiments, the foam does not contain a silicone based additive.

In some embodiments, the silicone based additive is a silicone based surfactant. In some embodiments, the silicone based additive is a TEGOSTAB® surfactant. In some embodiments, the silicone based additive is TEGOSTAB® B 8871.

In some embodiments, the blowing agent is in an amount of about 0.1% to about 2% or 0.1% to about 1% on a weight-by-weight basis of the foam. For example, the blowing agent is in an amount of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% on a weight-by-weight basis of the foam.

In some embodiments, the blowing agent is water.

In some embodiments, the PU catalyst is in an amount of about 0.1% to about 2% or 0.10% to about 1% on a weight-by-weight basis of the foam. For example, the PU catalyst is in an amount of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% on a weight-by-weight basis of the foam.

In some embodiments, the PU catalyst is a metal based catalyst or an amine based catalyst. In some embodiments, the metal catalyst is a bismuth-based catalyst. In some embodiments, the bismuth-based catalyst is BiCAT® 8840. In some embodiments, the amine catalyst is a tertiary amine catalyst. In some embodiments, the amine catalyst is Dabco® 33-LV. In some embodiments, the amine catalyst is JEFFCAT® ZF-20.

In some embodiments, the PU catalyst comprises a polyol resin blend (B-side component; all PU components except isocyanate) in an amount of about 20% to about 60% or about 30% to about 50% on a weight-by-weight basis of the foam. For example, the polyol resin blend is in an amount of about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% on a weight-by-weight basis of the foam.

In some embodiments, the PU catalyst comprises an isocyanate (A-side component) in an amount of about 40% to about 80% or about 50% to about 70% on a weight-by-weight basis of the foam. For example, the isocyanate is in an amount of about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80% on a weight-by-weight basis of the foam.

In some embodiments, the isocyanate is a diisocyanate. In some embodiments, the isocyanate is a pure MDI. In some embodiments, the isocyanate is a polymeric MDI. In some embodiments, the isocyanate is Rubinate® isocyanate. In some embodiments, the isocyanate is Rubinate® M In one aspect, a PU foam described herein comprises:
a) 20-50% (w/w) of a TAG-derived polyol;
b) 1-10% (w/w) glycerol;
c) 0-10% (w/w) of a polyether polyol;
d) 0-2% (w/w) of a silicone based additive;
e) 0.1-2% (w/w) of a blowing agent;
f) 0.1-2% of a PU catalyst; and
g) 40-70% of an isocyanate.

Polyol Production

Microbial oil produced by oleaginous microbes has numerous advantages, including, but not limited to, improved production efficiency and TAG compositions that can be enhanced for generating polyols. Namely, increasing the levels of unsaturation of TAG compositions can enhance control of the chemistry involved in the generation of polyols. These characteristics of microbial oil result in a greater yield of —OH functionality relative to other currently available oils with greater TAG heterogeneity (hence, lower purity) and/or diversity (e.g., oilseed or plant derived oils). Thus, polyols derived from a microbial oil can be preferable in generating polymers, including in instances where physical properties of a polymer can be compromised by molecular impurities, such as non-hydroxylated fatty acids, that may be present in oils comprising a more diverse and/or heterogeneous TAG profile.

Methods of producing triglyceride oils from oleaginous microbes may also have reduced carbon footprints than methods of producing oils from cultivation of oilseeds. This may be particularly true when the sugar used for the cultivation of these microbes is sourced from energy efficient sugar cane mills that significantly rely on power supplied from co-generation of sugarcane bagasse.

Polyols derived from a microbial oil may be particularly useful for producing PU materials. For example, microbial oils may comprise relatively low TAG diversity, low fatty acid diversity, and the majority of fatty acids present in the microbial oil may be unsaturated fatty acids. A higher ratio of unsaturated fatty acid to saturated fatty acid allows for increased chemical reactivity at the double bonds. Microbial oils having low TAG diversity and a high proportion of unsaturated fatty acids are especially desirable in production of PUs because hydroxylation of such a mixture yields a greater percentage of fatty acids that can participate in crosslinking reactions with isocyanates. Unlike unsaturated fatty acids, saturated fatty acids which do not contain carbon-carbon double bounds and cannot participate in crosslinking reactions with isocyanates. Thus, polyols generated from hydroxylation of unsaturated fatty acids from microbial oil may yield PU materials having superior properties.

In the process of producing natural oil polyols (NOPs) from natural sources (such as bio-based materials), hydroxyl functionality can be introduced via a chemical conversion of the triglyceride oil. This conversion requires the presence of a double bond on the acyl moiety of the fatty acid, e.g., an olefinic group, which can be accomplished using several different chemistries including, for example:

i) Epoxidation in the presence of hydrogen peroxide and an acid catalyst, followed by ring opening with reagents, such as water, hydrogen, methanol, ethanol, or other polyols. Ring opening can be facilitated by reaction with an alcohol, including, for example, β-substituted alcohols. These chemistries result in secondary hydroxyl moieties, and are therefore less reactive, for example, with isocyanate or methyl esters.

ii) Ozonolysis by molecular oxygen results in the formation of ozonides, which upon further oxidation results in scission at the double bond and formation of di-acids, carboxylic acids, and upon reduction with hydrogen, formation of aldehydes. Ozonolysis and reduction of oleic acid, for example, produces azelaic acid, pelargonic acid, and pelargonaldehyde, respectively.

iii) Hydroformylation with synthesis gas (syngas), using rhodium or cobalt catalysts to form the aldehyde at the olefinic group, followed by reduction of the aldehyde to alcohol in the presence of hydrogen.

While typically carried out in organic solvent, processes that utilize aqueous systems can also improve the sustainability of these chemistries. Of the chemistries described above, only hydroformylation results in the preservation of fatty acid length and formation of primary —OH moieties. Furthermore, only olefinic fatty acids with a double bond that is converted into a site possessing hydroxyl functionality, either through epoxidation and ring opening, ozonolysis, or hydroformylation/reduction, can participate in subsequent downstream chemistries, i.e., reaction with an isocyanate moiety to form a urethane linkage or reaction with methyl esters to form polyesters. All other fatty acids, namely, fully saturated fatty acids that do not contain carbon-carbon double bonds, cannot participate in crosslinking reactions with isocyanates. Hence, saturated fatty acids will compromise the structural integrity and degrade performance of the polymer produced therefrom.

The complexity and physical properties of a triglyceride oil can be evaluated by the fatty acid profile, and the triacylglycerol (TAG) profile. The fatty acid profile is a measure of fatty acid composition. The fatty acid profile of a triglyceride oil can be determined by subjecting oils to transesterification to generate fatty acid methyl esters and subsequently quantitating fatty acid type by Gas Chromatography with Flame Ionization Detector (GC-FID).

Additionally, if the fatty acid profile can be modulated such that the concentration of a particular species of mono-unsaturated or polyunsaturated fatty acids can be significantly increased from the concentration in the native oil, there would be an overall decrease in the diversity of TAG species present in the resulting oil. The net effect is that a higher number of hydroxylated fatty acids and a higher proportion of all TAG species can participate in urethane chemistries. For example, in two cultivars of peanut oil, N-3101 and H4110, oleic acid content was increased from 46% to 80%, and total monounsaturated and polyunsaturated fatty acids was increased only subtly, from 77% to 84%, respectively. According to the TAG profile of the resulting oils derived from the two cultivars, approximately 95% of all TAG species are accounted for in just eight regioisomers in cultivar H4110 and 23 regioisomers in cultivar N-3101. Thus, triglycerides that are significantly enriched in a single species result in more homogeneous substrates for subsequent chemical manipulations and incorporation into materials.

Provided herein are methods for the conversion of oils into highly homogenous polyols via hydroformylation and hydrogenation, as well as epoxidation and ring opening. The molecular purity of these polyols can be advantageous for all types of PU applications, including, but not limited to, as coatings for textiles and surfaces, as adhesives in packaging, textile, and industrial applications, as well as in hard and soft foam and elastomeric applications.

Microbial Oils

Microbial oils described herein include novel triglycerides derived from a microbe. Microbial oils can be produced using oleaginous microbes.

Oleaginous microbes can refer to species of microbes having oil contents in excess of 20% on a dry cell weight basis. These microbes are uniquely suited for generating highly pure, bio-based polyols with hydroxyl (—OH) functionality. Oleaginous microbes have also been proven extremely facile for genetic modification and improvement.

Indeed, these improvements can occur on time scales that are greatly accelerated relative to what can be achieved in higher plant oilseeds. Oleaginous microbes offer tremendous utility in generating large quantities of triglyceride oils in short periods of time. In as little as 48 hours, appreciable oil production of about 30-40% oil (dry cell weight) can be obtained, whereas typical production requires 120 hours or more to achieve 70-80% oil (dry cell weight).

Furthermore, because these microbes can be heterotrophically grown using simple sugars, the production of these triglyceride oils can be divorced from the traditional constraints imposed by geography, climate, and season that constrain triglyceride oil production from oilseed crops.

Recombinant DNA techniques can be used to engineer or modify oleaginous microbes to produce triglyceride oils having desired fatty acid profiles and regiospecific or stereospecific profiles. Fatty acid biosynthetic genes, including, for example, those encoding stearoyl-ACP desaturase, delta-12 fatty acid desaturase, acyl-ACP thioesterase, ketoacyl-ACP synthase, and lysophosphatidic acid acyltransferase can be manipulated to increase or decrease expression levels and thereby biosynthetic activity. These genetically engineered microbes can produce oils having enhanced oxidative, or thermal stability, rendering a sustainable feedstock source for various chemical processes. The fatty acid profile of the oils can be enriched in midchain profiles or the oil can be enriched in triglycerides having specific saturation or unsaturation contents. WO2010/063031, WO2010/120923, WO2012/061647, WO2012/106560, WO2013/082186, WO2013/158938, WO2014/176515, WO2015/051319, and Lin et al. (2013) *Bioengineered*, 4:292-304, and Shi and Zhao. (2017) *Front. Microbiol.*, 8: 2185 each discloses microbe genetic engineering techniques for oil production.

Among microalgae, several genera and species are particularly suitable for producing triglyceride oils that can be converted to polyols including, but not limited to, *Chlorella* sp., *Pseudochlorella* sp., *Prototheca* sp., *Arthrospira* sp., *Euglena* sp., *Nannochloropsis* sp. *Phaeodactylum* sp., *Chlamydomonas* sp., *Scenedesmus* sp., *Ostreococcus* sp., *Selenastrum* sp., *Haematococcus* sp., *Nitzschia, Dunaliella, Navicula* sp., *Pseudotrebouxia* sp., *Heterochlorella* sp., *Trebouxia* sp., *Vavicula* sp., *Bracteococcus* sp., *Gomphonema* sp., *Watanabea* sp., *Botryococcus* sp., *Tetraselmis* sp., and *Isochrysis* sp.

Among oleaginous yeasts, several genera are particularly suitable for producing triglyceride oils that can be converted to polyols including, but not limited to, *Candida* sp., *Cryptococcus* sp., *Debaromyces* sp., *Endomycopsis* sp., *Geotrichum* sp., *Hyphopichia* sp., *Lipomyces* sp., *Pichia* sp., *Rodosporidium* sp., *Rhodotorula* sp., *Sporobolomyces* sp., *Starmerella* sp., *Torulaspora* sp., *Trichosporon* sp., *Wickerhamomyces* sp., *Yarrowia* sp., and *Zygoascus* sp.

Among oleaginous bacteria, there are several genera and species which are particularly suited to producing triglyceride oils that can be converted to polyols including, but not limited to *Flavimonas oryzihabitans, Pseudomonas aeruginosa, Morococcus* sp., *Rhodobacter sphaeroides, Rhodococcus opacus, Rhodococcus erythropolis, Streptomyces jeddahensis, Ochrobactrum* sp., *Arthrobacter* sp., *Nocardia* sp., *Mycobacteria* sp., *Gordonia* sp., *Catenisphaera* sp., and *Dietzia* sp.

Growth of Oleaginous Microbes and Extraction of Microbial Oil

Oleaginous microbes may be cultivated in a bioreactor or fermenter. For example, heterotrophic oleaginous microbes can be cultivated on a sugar-containing nutrient broth.

Oleaginous microbes produce microbial oil, which comprises triacylglycerides or triacylglycerols and may be stored in storage bodies of the cell. A raw oil may be obtained from microbes by disrupting the cells and isolating the oil. WO2008/151149, WO2010/06032, WO2011/150410, WO2012/061647, and WO2012/106560 each discloses heterotrophic cultivation and oil isolation techniques. For example, microbial oil may be obtained by providing or cultivating, drying and pressing the cells. Microbial oils produced may be refined, bleached, and deodorized (RBD) as described in WO2010/120939, which is entirely incorporated herein by reference. Microbial oils can be obtained without further enrichment of one or more fatty acids or triglycerides with respect to other fatty acids or triglycerides in the raw oil composition.

Microbial Oil Content

A microbial oil may be characterized by its triacylglycerol ("TAG") profile. A TAG profile indicates relative amounts of various TAGs, and consequently fatty acids (each TAG molecule is a tri-ester of glycerol and three fatty acids), present in microbial oil. As disclosed herein, fatty acids from microbial oils having TAG profiles comprising high levels of unsaturated fatty acids and/or having low TAG diversity may be hydroformylated and hydrogenated to produce hydroformylated polyols.

A microbial oil may have a TAG profile comprising a high proportion of one or more unsaturated fatty acids relative to other fatty acids in the microbial oil. A microbial oil may have a TAG profile comprising 60% or more of one or more unsaturated fatty acids.

A microbial oil may have a TAG profile comprising a high proportion of one or more unsaturated fatty acids relative to one or more saturated fatty acids in the microbial oil. A microbial oil may have a TAG profile comprising low TAG diversity, e.g., fewer TAG species than in, for example, an oilseed oil. Microbial oils rich in a TAG or fatty acid may comprise fewer, different TAG species, or lesser amounts of different TAG species.

Oils derived from microorganisms having TAG profiles with high purity/high homogeneity/low diversity and high unsaturated fatty acid content are particularly advantageous for use in PU production. Highly pure oils improve product yield and reduce the likelihood of contaminants that adversely affect the physical properties of the resulting PU. Highly unsaturated oils allow for increased numbers of primary alcohol groups formed during hydroformylation and hydrogenation, thereby increasing the functionality, reactivity, and crosslinking during subsequent polymerization reactions. The quantity and type of crosslinking can influence the stability, durability, and rigidity of the resulting polymer.

In some embodiments, the microbial oil comprises up to nine, up to eight, up to seven, up to six, up to five, up to four, up to three, up to two, or one TAG species present in amounts of 1% or more of the total TAG species.

In some embodiments, the microbial oil comprises one TAG species present in amounts of about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more of the total TAG species.

In some embodiments, the microbial oil comprises two TAG species present in amounts of about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more of the total TAG species.

In some embodiments, the microbial oil comprises three TAG species present in amounts of about 85% or more, about 86% or more, about 87% or more, about 88% or more, about 89% or more, about 90% or more, about 91% or more, about 92% or more, about 93% or more, about 94% or more, about 95% or more, about 96% or more, about 97% or more, about 98% or more, or about 99% or more of the total TAG species.

Non-limiting examples of TAG species include OOO, LLL, LnLnLn, LLP, LPL, LnLnP, LnPLn, and any regioisomer thereof, where each O is olein, each L is linolein, each Ln is linolenin, and each P is palmitin. In some embodiments, the predominant TAG species in the microbial oil is OOO, LLL, LnLnLn, LLP, LPL, LnLnP, LnPLn, or any regioisomer thereof.

In some embodiments, the predominant TAG species in the microbial oil is OOO or triolein. In some embodiments, the microbial oil comprises at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, or at least about 99% of triolein.

In some embodiments, the fatty acid profile of the microbial oil comprises at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of any one or combination of unsaturated fatty acid species.

Non-limiting examples of unsaturated fatty acid species include of a 16:1 fatty acid, a 16:2 fatty acid, a 16:3 fatty acid, an 18:1 fatty acid, an 18:2 fatty acid, an 18:3 fatty acid, an 18:4 fatty acid, a 20:1 fatty acid, a 20:2 fatty acid, a 20:3 fatty acid, a 22:1 fatty acid, a 22:2 fatty acid, a 22:3 fatty acid, a 24:1 fatty acid, a 24:2 fatty acid, and a 24:3 fatty acid.

In some embodiments, the fatty acid profile of an oil described herein comprises up to about 1%, up to about 2%, up to about 3%, up to about 4%, up to about 5%, up to about 6%, up to about 7%, up to about 8%, up to about 9%, up to about 10%, up to about 11%, least about 12%, up to about 13%, up to about 14%, up to about 15%, up to about 16%, up to about 17%, up to about 18%, up to about 19%, up to about 20%, up to about 21%, up to about 22%, up to about 23%, up to about 24%, up to about 25%, up to about 26%, up to about 27%, up to about 28%, up to about 29%, up to about 30%, up to about 31%, up to about 32%, up to about 33%, up to about 34%, or up to about 35% of any one or combination of saturated fatty acid species. Non-limiting examples of saturated fatty acid species include a 16:0 fatty acid, an 18:0 fatty acid, a 20:0 fatty acid, a 22:0 fatty acid, a 22:0 fatty acid, or a 24:0 fatty acid.

In some embodiments, the fatty acid profile of an oil described herein comprises about 60%, about 61%, about 62%, about 63%, about 64%, about 65%, about 66%, about 67%, about 68%, about 69%, about 70%, least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of any one or combination of unsaturated fatty acid species. Non-limiting examples of unsaturated fatty acid species include a 16:1 fatty acid, a 16:2 fatty acid, a 16:3 fatty acid, an 18:1 fatty acid, an 18:2 fatty acid, an 18:3 fatty acid, an 18:4 fatty acid, a 20:1 fatty acid, a 20:2 fatty acid, a 20:3 fatty acid, a 22:1 fatty acid, a 22:2 fatty acid, a 22:3 fatty acid, a 24:1 fatty acid, a 24:2 fatty acid, and a 24:3 fatty acid.

In some embodiments, the fatty acid profile of an oil described herein comprises at least about 60%, at least about 61%, at least about 62%, at least about 63%, at least about 64%, at least about 65%, at least about 66%, at least about 67%, at least about 68%, at least about 69%, at least about 70%, least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of any one or combination of unsaturated fatty acid species.

In some embodiments, the fatty acid profile of an oil described herein comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of any one or combination of unsaturated fatty acid species.

Non-limiting examples of unsaturated fatty acid species include those listed in TABLE 1.

TABLE 1

| Monounsaturated FA | Lipid Number | Polyunsaturated FA | Lipid Number |
|---|---|---|---|
| Myristoleic acid | C14:1 | Hexadecatrienoic acid (HTA) | C16:3 |
| Palmitoleic acid | C16:1 | Linoleic acid | C18:2 |
| Sapienic acid | C16:1 | Linolelaidic acid | C18:2 |
| Oleic acid | C18:1 | α-Linolenic acid | C18:3 |
| Elaidic acid | C18:1 | Pinolenic acid | C18:3 |
| Vaccenic acid | C18:1 | Stearidonic acid | C18:4 |
| Petroselinic acid | C18:1 | Eicosadienoic acid | C20:2 |
| Eicosenoic (Gondoic) acid | C20:1 | Mead acid | C20:3 |
| Paullinic acid | C20:1 | Eicosatrienoic acid (ETE) | C20:3 |
| Gadoleic acid | C20:1 | Dihomo-γ-linolenic acid (DGLA) | C20:3 |

TABLE 1-continued

| Monounsaturated FA | Lipid Number | Polyunsaturated FA | Lipid Number |
|---|---|---|---|
| Erucic acid | C22:1 | Podocarpic acid | C20:3 |
| Brassidic acid | C22:1 | Arachidonic acid (AA) | C20:4 |
| Nervonic acid | C24:1 | Eicosatetraenoic acid (ETA) | C20:4 |
| | | Eicosapentaenoic acid (EPA) | C20:5 |
| | | Heneicosapentaenoic acid (HPA) | C21:5 |
| | | Docosadienoic acid | C22:2 |
| | | Adrenic acid (AdA) | C22:4 |
| | | Docosapentaenoic acid (Osbond acid) | C22:5 |
| | | Docosahexaenoic acid (DPA) | C22:5 |
| | | Docosahexaenoic acid (DHA) | C22:6 |
| | | Tetracosatetraenoic acid | C24:4 |
| | | Tetracosapentaenoic acid | C24:5 |

In some embodiments, the fatty acid profile of a microbial oil described herein comprises at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of an 18:1 fatty acid.

In some embodiments, the fatty acid profile of a microbial oil described herein comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of an 18:1 fatty acid.

In some embodiments, the fatty acid profile of a microbial oil described herein at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% of oleic acid.

In some embodiments, the fatty acid profile of a microbial oil described herein comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% of oleic acid or oleate.

In some embodiments, the fatty acid profile a microbial oil described herein comprises up to about 1%, up to about 2%, up to about 3%, up to about 4%, up to about 5%, up to about 6%, up to about 7%, up to about 8%, up to about 9%, up to about 10%, up to about 11%, least about 12%, up to about 13%, up to about 14%, up to about 15%, up to about 16%, up to about 17%, up to about 18%, up to about 19%, up to about 20%, up to about 21%, up to about 22%, up to about 23%, up to about 24%, up to about 25%, up to about 26%, up to about 27%, up to about 28%, up to about 29%, up to about 30%, up to about 31%, up to about 32%, up to about 33%, up to about 34%, or up to about 35% of any one or combination of saturated fatty acid species selected from the group consisting of a 16:0 fatty acid, an 18:0 fatty acid, a 20:0 fatty acid, a 22:0 fatty acid, and a 24:0 fatty acid.

In some embodiments, a microbial oil comprises 60% or more of an 18:1 fatty acid and 30% or less of one or more saturated fatty acids. In some embodiments, the microbial oil comprises at least 85% oleate and up to 5% linoleate.

In some embodiments, a microbial oil comprises 60% or more of an 18:1 fatty acid, 30% or less of one or more saturated fatty acids, and at least one unsaturated fatty acid in a remainder. In some embodiments, the microbial oil comprises at least 85% oleate, up to 5% linoleate, and up to 1.8% palmitate.

In some embodiments, a microbial oil comprises at least 60% of an 18:1 fatty acid and up to 15% of one or more other unsaturated fatty acids selected from the group consisting of: a 16:1 fatty acid, an 18:2 fatty acid, an 18:3 fatty acid, and any combination thereof.

In some embodiments, a microbial oil comprises at least 60% of an 18:1 fatty acid, up to 10% of an 18:2 fatty acid, and up to 20% of a 16:0 fatty acid.

In some embodiments, a microbial oil comprises at least 70% of an 18:1 fatty acid, up to 8% of an 18:2 fatty acid, and up to 12% of a 16:0 fatty acid.

In some embodiments, a microbial oil comprises at least 80% of an 18:1 fatty acid, up to 8% of an 18:2 fatty acid, and up to 5% of a 16:0 fatty acid.

In some embodiments, a microbial oil has an iodine value of 88 g $I_2$/100 g.

Materials Testing

PU foams described herein can be characterized by their physical properties including, for example, density, strength, and specific strength. Specific strength is based on both density and a strength metric.

For example, strength of a material can be assessed by compressive strength, compressive strength as a function of deflection (e.g., at 10% deflection, at 50% deflection, etc.), specific compressive strength, tensile strength, specific tensile strength, strain at break, stress at break, specific strength at break, strength at yield, or specific strength at yield.

Figure 7:
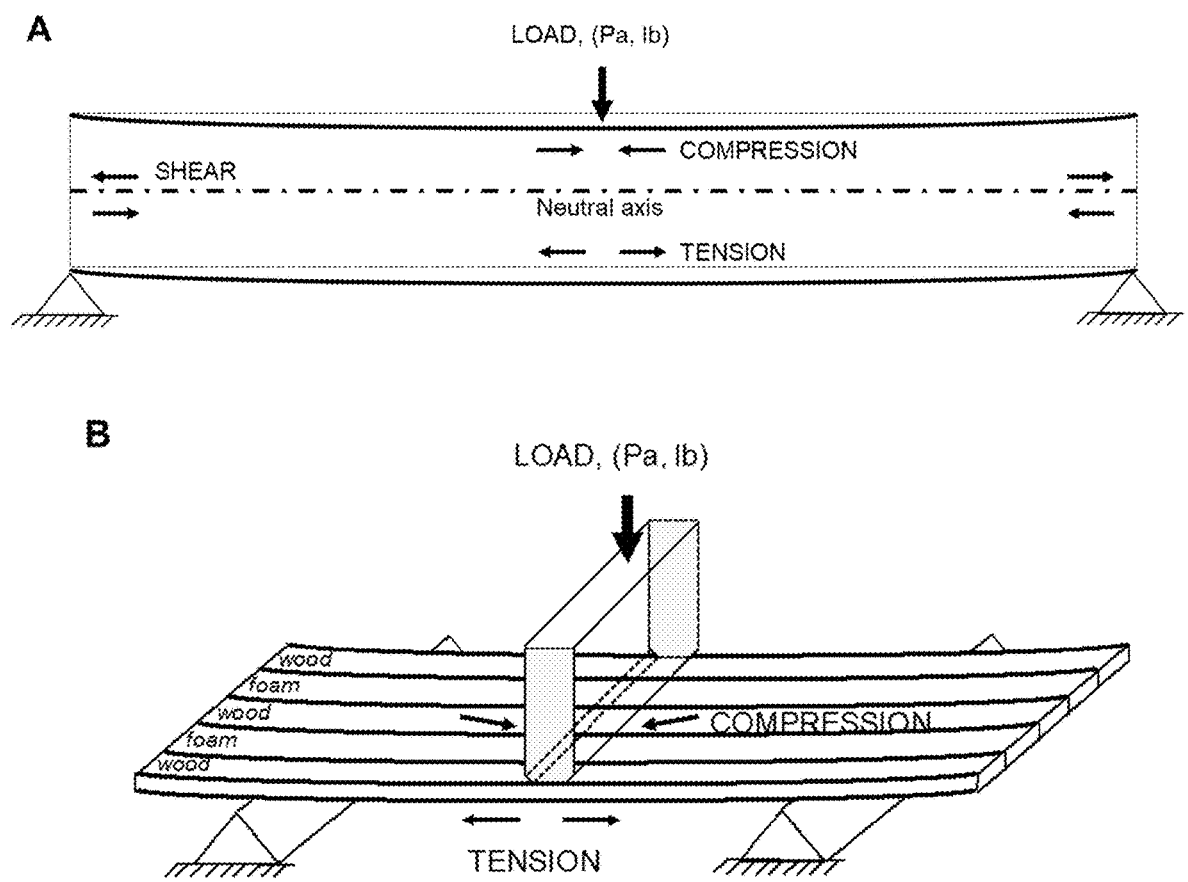
FIG. 7, Panel A illustrates a schematic of three-point bend flexural testing of a material, adapted from Hoadley, R. B. 1980. Understanding Wood. The Taunton Press, Inc. Newtown, CT. Panel B illustrates a schematic of three-point bend flexural testing of a wood-foam composite described herein.

Physical properties of materials and composites thereof can be assessed using various testing methods including, but not limited to, three-point bend flexural testing, e.g., ASTM D790, and compressive strength testing, e.g., ASTM D3574. FIG. 7, Panel A illustrates a schematic of three-point bend flexural testing of a material (e.g., a wooden beam). When the material is subjected to three-point bend testing where application of a load exerts a series of force vectors on the material including compression at the site of impact, shear along the neutral axis and tension opposite the site of the load. FIG. 7, Panel B illustrates a schematic of three-point bend flexural testing of a foam-wood composite described herein. In this example, a load is applied to the surface that is orthogonal to the direction of which the foam and wood components are layered.

PU Foams

In one aspect, a PU foam described herein can have a density of about 200 kg/m$^3$ or less, about 190 kg/m$^3$ or less, about 180 kg/m$^3$ or less, about 170 kg/m$^3$ or less, about 160 kg/m$^3$ or less, or about 150 kg/m$^3$ or less. In some embodiments, a PU foam has a density of from about 50 kg/m$^3$ to about 200 kg/m$^3$, about 90 kg/m$^3$ to about 170 kg/m$^3$, about 100 kg/m$^3$ to about 160 kg/m$^3$, or about 100 kg/m$^3$ to about 150 kg/m$^3$. For example, a PU foam has a density of about 200 kg/m$^3$, about 190 kg/m$^3$, about 180 kg/m$^3$, about 170 kg/m$^3$, about 160 kg/m$^3$, about 150 kg/m$^3$, about 140 kg/m$^3$, about 130 kg/m$^3$, about 120 kg/m$^3$, about 110 kg/m$^3$, about 100 kg/m$^3$, about 90 kg/m$^3$, about 80 kg/m$^3$, about 70 kg/m$^3$, about 60 kg/m$^3$, or about 50 kg/m$^3$.

In one aspect, a PU foam described herein can have a compressive strength at 10% deflection of about 500 kPa or more, about 600 kPa or more, about 700 kPa or more, about 800 kPa or more, about 900 kPa or more, about 1000 kPa or more, about 1100 kPa or more, about 1200 kPa or more, about 1300 kPa or more, about 1400 kPa or more, about 1500 kPa or more, about 1600 kPa or more, about 1700 kPa or more, about 1800 kPa or more, about 1900 kPa or more, or about 2000 kPa or more. In some embodiments, a PU foam has a compressive strength at 10% deflection of from about 500 kPa to about 2000 kPa, about 500 kPa to about 1000 kPa, or about 1000 kPa to about 2000 kPa. For example, a PU foam has compressive strength at 50% deflection of about 500 kPa, about 600 kPa, about 700 kPa, about 800 kPa, about 900 kPa, about 1000 kPa, about 1100 kPa, about 1200 kPa, about 1300 kPa, about 1400 kPa, about 1500 kPa, about 1600 kPa, about 1700 kPa, about 1800 kPa, about 1900 kPa, or about 2000 kPa.

In one aspect, a PU foam described herein can have a specific strength at 10% deflection of about 5 kPa/kg·m$^3$ or more, about 6 kPa/kg·m$^3$ or more, about 7 kPa/kg·m$^3$ or more, about 8 kPa/kg·m$^3$ or more, about 9 kPa/kg·m$^3$ or more, about 10 kPa/kg·m$^3$ or more, about 11 kPa/kg·m$^3$ or more, about 12 kPa/kg·m$^3$ or more, about 13 kPa/kg·m$^3$ or more, about 14 kPa/kg·m$^3$ or more, about 15 kPa/kg·m$^3$ or more, about 16 kPa/kg·m$^3$ or more, about 17 kPa/kg·m$^3$ or more, about 18 kPa/kg·m$^3$ or more, about 19 kPa/kg·m$^3$ or more, or about 20 kPa/kg·m$^3$ or more. In some embodiments, a PU foam has a specific strength at 10% deflection of from about 5 kPa/kg·m$^3$ to about 20 kPa/kg·m$^3$, about 5 kPa/kg·m$^3$ to about 15 kPa/kg·m$^3$, about 5 kPa/kg·m$^3$ to about 10 kPa/kg·m$^3$, about 10 kPa/kg·m$^3$ to about 15 kPa/kg·m$^3$, or about 8 kPa/kg·m$^3$ to about 15 kPa/kg·m$^3$. For example, a PU foam has specific strength at 10% deflection of about 5 kPa/kg·m$^3$, about 6 kPa/kg·m$^3$, about 7 kPa/kg·m$^3$, about 8 kPa/kg·m$^3$, about 9 kPa/kg·m$^3$, about 10 kPa/kg·m$^3$, about 11 kPa/kg·m$^3$, about 12 kPa/kg·m$^3$, about 13 kPa/kg·m$^3$, about 14 kPa/kg·m$^3$, about 15 kPa/kg·m$^3$, about 16 kPa/kg·m$^3$, about 17 kPa/kg·m$^3$, about 18 kPa/kg·m$^3$, about 19 kPa/kg·m$^3$, or about 20 kPa/kg·m$^3$.

In one aspect, a PU foam described herein can have a compressive strength at 50% deflection of about 500 kPa or more, about 600 kPa or more, about 700 kPa or more, about 800 kPa or more, about 900 kPa or more, about 1000 kPa or more, about 1100 kPa or more, about 1200 kPa or more, about 1300 kPa or more, about 1400 kPa or more, about 1500 kPa or more, about 1600 kPa or more, about 1700 kPa or more, about 1800 kPa or more, about 1900 kPa or more, or about 2000 kPa or more. In some embodiments, a PU foam has a compressive strength at 50% deflection of from about 500 kPa to about 2000 kPa, about 500 kPa to about 1000 kPa, or about 1000 kPa to about 2000 kPa. For example, a PU foam has compressive strength at 50% deflection of about 500 kPa, about 600 kPa, about 700 kPa, about 800 kPa, about 900 kPa, about 1000 kPa, about 1100 kPa, about 1200 kPa, about 1300 kPa, about 1400 kPa, about 1500 kPa, about 1600 kPa, about 1700 kPa, about 1800 kPa, about 1900 kPa, or about 2000 kPa.

In one aspect, a PU foam described herein can have a specific strength at 50% deflection of about 5 kPa/kg·m$^3$ or more, about 6 kPa/kg·m$^3$ or more, about 7 kPa/kg·m$^3$ or more, about 8 kPa/kg·m$^3$ or more, about 9 kPa/kg·m$^3$ or more, about 10 kPa/kg·m$^3$ or more, about 11 kPa/kg·m$^3$ or more, about 12 kPa/kg·m$^3$ or more, about 13 kPa/kg·m$^3$ or more, about 14 kPa/kg·m$^3$ or more, about 15 kPa/kg·m$^3$ or more, about 16 kPa/kg·m$^3$ or more, about 17 kPa/kg·m$^3$ or more, about 18 kPa/kg·m$^3$ or more, about 19 kPa/kg·m$^3$ or more, or about 20 kPa/kg·m$^3$ or more. In some embodiments, a PU foam has a specific strength at 50% deflection of from about 5 kPa/kg·m$^3$ to about 20 kPa/kg·m$^3$, about 5 kPa/kg·m$^3$ to about 15 kPa/kg·m$^3$, about 5 kPa/kg·m$^3$ to about 10 kPa/kg·m$^3$, about 10 kPa/kg·m$^3$ to about 15 kPa/kg·m$^3$, or about 8 kPa/kg·m$^3$ to about 15 kPa/kg·m$^3$. For example, a PU foam has specific strength at 50% deflection of about 5 kPa/kg·m$^3$, about 6 kPa/kg·m$^3$, about 7 kPa/kg·m$^3$, about 8 kPa/kg·m$^3$, about 9 kPa/kg·m$^3$, about 10 kPa/kg·m$^3$, about 11 kPa/kg·m$^3$, about 12 kPa/kg·m$^3$, about 13 kPa/kg·m$^3$, about 14 kPa/kg·m$^3$, about 15 kPa/kg·m$^3$, about 16 kPa/kg·m$^3$, about 17 kPa/kg·m$^3$, about 18 kPa/kg·m$^3$, about 19 kPa/kg·m$^3$, or about 20 kPa/kg·m$^3$.

Wood

In one aspect, a species of wood described herein can have a density of about 700 kg/m$^3$ or less, about 600 kg/m$^3$ or less, about 500 kg/m$^3$ or less, about 400 kg/m$^3$ or less, about 300 kg/m$^3$ or less, or about 200 kg/m$^3$ or less. In some embodiments, a species of wood has a density of from about 100 kg/m$^3$ to about 1000 kg/m$^3$, about 100 kg/m$^3$ to about 700 kg/m$^3$, about 100 kg/m$^3$ to about 600 kg/m$^3$, about 100 kg/m$^3$ to about 500 kg/m$^3$, about 200 kg/m$^3$ to about 500 kg/m$^3$, about 100 kg/m$^3$ to about 200 kg/m$^3$, about 200 kg/m$^3$ to about 300 kg/m$^3$, about 300 kg/m$^3$ to about 400 kg/m$^3$, about 400 kg/m$^3$ to about 500 kg/m$^3$, about 500 kg/m$^3$ to about 600 kg/m$^3$, or about 600 kg/m$^3$ to about 700 kg/m$^3$. For example, a species of wood has a density of about 100 kg/m$^3$, about 110 kg/m$^3$, about 120 kg/m$^3$, about 130 kg/m$^3$, about 140 kg/m$^3$, about 150 kg/m$^3$, about 160 kg/m$^3$, about 170 kg/m$^3$, about 180 kg/m$^3$, about 190 kg/m$^3$, about 200 kg/m$^3$, about 210 kg/m$^3$, about 220 kg/m$^3$, about 230 kg/m$^3$, about 240 kg/m$^3$, about 250 kg/m$^3$, about 260 kg/m$^3$, about 270 kg/m$^3$, about 280 kg/m$^3$, about 290 kg/m$^3$, about 300 kg/m$^3$, about 310 kg/m$^3$, about 320 kg/m$^3$, about 330 kg/m$^3$, about 340 kg/m$^3$, about 350 kg/m$^3$, about 360 kg/m$^3$, about 370 kg/m$^3$, about 380 kg/m$^3$, about 390 kg/m$^3$, about 400 kg/m$^3$, about 410 kg/m$^3$, about 420 kg/m$^3$, about 430 kg/m$^3$, about 440 kg/m$^3$, about 450 kg/m$^3$, about 460 kg/m$^3$, about 470 kg/m$^3$, about 480 kg/m$^3$, about 490 kg/m$^3$, about 500 kg/m$^3$, about 510 kg/m$^3$, about 520 kg/m$^3$, about 530 kg/m$^3$, about 540 kg/m$^3$, about 550 kg/m$^3$, about 560 kg/m$^3$, about 570 kg/m$^3$, about 580 kg/m$^3$, about 590 kg/m$^3$, about 600 kg/m$^3$, about 610 kg/m$^3$, about 620 kg/m$^3$, about 630 kg/m$^3$, about 640 kg/m$^3$, about 650 kg/m$^3$, about 660 kg/m$^3$, about 670 kg/m$^3$, about 680 kg/m$^3$, about 690 kg/m$^3$, or about 700 kg/m$^3$.

In one aspect, a species of wood described herein can have a strain at break of about 1% or more, about 2% or more, about 3% or more, about 4% or more, or about 5% or more. In some embodiments, a species of wood has a strain at break of from about 1% to about 5%, about 1% to about 3%, or about 1% to about 2%. For example, a species of wood has a strain at break of about 1%, about 1.1%, about 1.2%, about 1.3%, about 1.4%, about 1.5%, about 1.6%, about 1.7%, about 1.8%, about 1.9%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.4%, about 3.5%, about 3.6%, about 3.7%, about 3.8%, about 3.9%, about 4%, about 4.1%, about 4.2%, about 4.3%, about 4.4%, about 4.5%, about 4.6%, about 4.7%, about 4.8%, about 4.9%, or about 5%.

In one aspect, a species of wood described herein can have a stress at break of about 100 MPa or more, about 200 MPa or more, about 300 MPa or more, about 400 MPa or more, about 500 MPa or more, about 600 MPa or more, about 700 MPa or more, about 800 MPa or more, about 900 MPa or more, about 1000 MPa or more, about 1100 MPa or more, about 1200 MPa or more, about 1300 MPa or more, about 1400 MPa or more, about 1500 MPa or more, about 1600 MPa or more, about 1700 MPa or more, about 1800 MPa or more, about 1900 MPa or more, about 2000 MPa or more. In some embodiments, a species of wood has a stress at break of from about 100 MPa to about 2000 MPa, about 100 MPa to about 1500 MPa, about 100 MPa to about 1000 MPa, about 100 MPa to about 500 MPa, about 500 MPa to about 1000 MPa, or about 200 MPa to about 1000 MPa. For example, a species of wood has a stress at break of about 100 MPa, about 200 MPa, about 300 MPa, about 400 MPa, about 500 MPa, about 600 MPa, about 700 MPa, about 800 MPa, about 900 MPa, about 1000 MPa, about 1100 MPa, about 1200 MPa, about 1300 MPa, about 1400 MPa, about 1500 MPa, about 1600 MPa, about 1700 MPa, about 1800 MPa, about 1900 MPa, or about 2000 MPa.

In one aspect, a species of wood described herein can have a specific strength at break of about 0.1 MPa/kg·m$^3$ or more, about 0.2 MPa/kg·m$^3$ or more, about 0.3 MPa/kg·m$^3$ or more, about 0.4 MPa/kg·m$^3$ or more, about 0.5 MPa/kg·m$^3$ or more, about 0.6 MPa/kg·m$^3$ or more, about 0.7 MPa/kg·m$^3$ or more, about 0.8 MPa/kg·m$^3$ or more, about 0.9 MPa/kg·m$^3$ or more, about 1 MPa/kg·m$^3$ or more, about 1.1 MPa/kg·m$^3$ or more, about 1.2 MPa/kg·m$^3$ or more, about 1.3 MPa/kg·m$^3$ or more, about 1.4 MPa/kg·m$^3$ or more, about 1.5 MPa/kg·m$^3$ or more, about 1.6 MPa/kg·m$^3$ or more, about 1.7 MPa/kg·m$^3$ or more, about 1.8 MPa/kg·m$^3$ or more, about 1.9 MPa/kg·m$^3$ or more, or about 2 MPa/kg·m$^3$ or more. In some embodiments, a species of wood has a specific strength at break of from about 0.5 MPa/kg·m$^3$ to about 2 MPa/kg·m$^3$, about 0.5 MPa/kg·m$^3$ to about 1 MPa/kg·m$^3$, or about 1 MPa/kg·m$^3$ to about 2 MPa/kg·m$^3$. For example, a species of wood has a specific strength at break of about 0.1 MPa/kg·m$^3$, about 0.2 MPa/kg·m$^3$, about 0.3 MPa/kg·m$^3$, about 0.4 MPa/kg·m$^3$, about 0.5 MPa/kg·m$^3$, about 0.6 MPa/kg·m$^3$, about 0.7 MPa/kg·m$^3$, about 0.8 MPa/kg·m$^3$, about 0.9 MPa/kg·m$^3$, about 1 MPa/kg·m$^3$, about 1.1 MPa/kg·m$^3$, about 1.2 MPa/kg·m$^3$, about 1.3 MPa/kg·m$^3$, about 1.4 MPa/kg·m$^3$, about 1.5 MPa/kg·m$^3$, about 1.6 MPa/kg·m$^3$, about 1.7 MPa/kg·m$^3$, about 1.8 MPa/kg·m$^3$, about 1.9 MPa/kg·m$^3$, or about 2 MPa/kg·m$^3$.

Foam-Wood Composites

Foam-wood composites can be produced by laminating a PU foam and one or more wood species described herein. These resulting composites can be characterized by their physical properties including, for example, bulk density, strength, and specific strength. In the construction of foam-wood composites, it can desirable to obtain a strong, yet lightweight composite material by adjusting the types of components based on physical properties and the amounts of the respective components. For example, *Paulownia* exhibits a very low density among common types of wood, but exhibits low specific strength. Conversely, aspen exhibits both a high density and a high specific strength. Thus, varying the combinations of one or more species of wood, or one or more types of foams can achieve an optimized balance of high strength and low weight, e.g., as a measure of specific strength.

In one aspect, a foam-wood composite described herein can have a bulk density of about 400 kg/m$^3$ or less, about 350 kg/m$^3$ or less, about 200 kg/m$^3$ or less, about 250 kg/m$^3$ or less, about 200 kg/m$^3$ or less, about 150 kg/m$^3$ or less, or about 100 kg/m$^3$ or less. In some embodiments, a foam-wood composite has a bulk density of from about 100 kg/m$^3$ to about 400 kg/m$^3$, about 200 kg/m$^3$ to about 400 kg/m$^3$, about 250 kg/m$^3$ to about 400 kg/m$^3$, about 250 kg/m$^3$ to about 350 kg/m$^3$, or about 200 kg/m$^3$ to about 300 kg/m$^3$. For example, a foam-wood composite has a bulk density of about 200 kg/m$^3$, about 210 kg/m$^3$, about 220 kg/m$^3$, about 230 kg/m$^3$, about 240 kg/m$^3$, about 250 kg/m$^3$, about 260 kg/m$^3$, about 270 kg/m$^3$, about 280 kg/m$^3$, about 290 kg/m$^3$, about 300 kg/m$^3$, about 310 kg/m$^3$, about 320 kg/m$^3$, about 330 kg/m$^3$, about 340 kg/m$^3$, about 350 kg/m$^3$, about 360 kg/m$^3$, about 370 kg/m$^3$, about 380 kg/m$^3$, about 390 kg/m$^3$, or about 400 kg/m$^3$.

In one aspect, a foam-wood composite described herein can have a stress at yield of about 100 MPa or more, about 200 MPa or more, about 300 MPa or more, about 400 MPa or more, or about 500 MPa or more. In some embodiments, a foam-wood composite has a stress at yield of from about 100 MPa to about 500 MPa, about 150 MPa to about 500 MPa, about 100 MPa to about 200 MPa, about 200 MPa to about 300 MPa, about 200 MPa to about 450 MPa, about 300 MPa to about 400 MPa, or about 400 MPa to about 500 MPa. For example, a foam-wood composite has a stress at yield of about 100 MPa, about 150 MPa, about 200 MPa, about 250 MPa, about 300 MPa, about 350 MPa, about 400 MPa, about 450 MPa, or about 500 MPa.

In one aspect, a foam-wood composite described herein can have a specific strength at yield of about 0.1 MPa/kg·m$^3$ or more, about 0.2 MPa/kg·m$^3$ or more, about 0.3 MPa/kg·m$^3$ or more, about 0.4 MPa/kg·m$^3$ or more, about 0.5 MPa/kg·m$^3$ or more, about 0.6 MPa/kg·m$^3$ or more, about 0.7 MPa/kg·m$^3$ or more, about 0.8 MPa/kg·m$^3$ or more, about 0.9 MPa/kg·m$^3$ or more, about 1 MPa/kg·m$^3$ or more, about 1.1 MPa/kg·m$^3$ or more, about 1.2 MPa/kg·m$^3$ or more, about 1.3 MPa/kg·m$^3$ or more, about 1.4 MPa/kg·m$^3$ or more, about 1.5 MPa/kg·m$^3$ or more, about 1.6 MPa/kg·m$^3$ or more, about 1.7 MPa/kg·m$^3$ or more, about 1.8 MPa/kg·m$^3$ or more, about 1.9 MPa/kg·m$^3$ or more, or about 2 MPa/kg·m$^3$ or more. In some embodiments, a foam-wood composite has a specific strength at yield of from about 0.5 MPa/kg·m$^3$ to about 2 MPa/kg·m$^3$, about 0.5 MPa/kg·m$^3$ to about 1 MPa/kg·m$^3$, about 0.5 MPa/kg·m$^3$ to about 1.5 MPa/kg·m$^3$, about 0.9 MPa/kg·m$^3$ to about 1.5 MPa/kg·m$^3$, or about 1 MPa/kg·m$^3$ to about 2 MPa/kg·m$^3$. For example, a foam-wood composite has a specific strength at yield of about 0.1 MPa/kg·m$^3$, about 0.2 MPa/kg·m$^3$, about 0.3 MPa/kg·m$^3$, about 0.4 MPa/kg·m$^3$, about 0.5 MPa/kg·m$^3$, about 0.6 MPa/kg·m$^3$, about 0.7 MPa/kg·m$^3$, about 0.8 MPa/kg·m$^3$, about 0.9 MPa/kg·m$^3$, about 1 MPa/kg·m$^3$, about 1.1 MPa/kg·m$^3$, about 1.2 MPa/kg·m$^3$, about 1.3 MPa/kg·m$^3$, about 1.4 MPa/kg·m$^3$, about 1.5 MPa/kg·m$^3$, about 1.6 MPa/kg·m$^3$, about 1.7 MPa/kg·m$^3$, about 1.8 MPa/kg·m$^3$, about 1.9 MPa/kg·m$^3$, or about 2 MPa/kg·m$^3$.

In some embodiments, a foam-wood composite described herein can have a bulk density of from about 200 kg/m$^3$ to about 400 kg/m$^3$, a stress at yield of from about 150 MPa to about 500 MPa, a specific strength at yield of about 0.5 MPa/kg·m$^3$ to about 2 MPa/kg·m$^3$, or any combination thereof.

In one aspect, a foam-wood composite described herein comprises a foam having a density of from about 100 kg/m$^3$ to about 160 kg/m$^3$; and one or more species of wood having a density of from about 400 kg/m$^3$ to about 500 kg/m$^3$, wherein the foam-wood composite has a specific strength at yield of from about 0.5 MPa/kg·m$^3$ to about 2 MPa/kg·m$^3$.

In one aspect, a foam-wood composite described herein comprises a foam having a density of from about 100 kg/m$^3$ to about 160 kg/m$^3$; and one or more species of wood having a density of from about 200 kg/m$^3$ to about 300 kg/m$^3$, wherein the foam-wood composite has a specific strength at yield of from about 0.5 MPa/kg·m$^3$ to about 2 MPa/kg·m$^3$.

In one aspect, a foam-wood composite described herein comprises a foam having a density of from about 100 kg/m$^3$ to about 160 kg/m$^3$; a first species of wood having a density of from about 400 kg/m$^3$ to about 500 kg/m$^3$; and a second species of wood having a density of from about 200 kg/m$^3$ to about 300 kg/m$^3$, wherein the foam-wood composite has a specific strength at yield of from about 0.5 MPa/kg·m$^3$ to about 2 MPa/kg·m$^3$.

EXAMPLES

Example 1. An Example Ski Composed of PU Derived from Microbial Oil

Skis can be designed to have a variety of contours, profiles, shapes, and dimensions based on the needs of the designer and the specific application of the ski.

FIG. 1, Panel A illustrates a cross-sectional view of an example ski having an example algal PU composite core. The top sheet (a) is a plastic-like material, including, but not limited to, thermoplastic, PU, ABS, TPU/ABS co-polymer, high molecular weight polyethylene, nylon, and polybutylene terephthalate (PBT). Below top sheet a is one or more layers of fiberglass or other fibrous material, such as plant or animal derived fibers (b). Fiber types include, for example, flax, hemp, and wool. The following core composite layer is the algal PU wood composite (c and d), which is flanked by two sidewalls (h). The composite core is underpinned by one or more additional layers of fiberglass or other fibrous material. The base layer or bottom sheet (e) is composed of polyethylene. The base layer also includes a metal edge (g). A layer of elastomeric material (f) sits atop the metal edge and functions to dampen vibrations that arise from the metal. The elastomeric material can be composed of rubber or neoprene.

FIG. 1, Panel B illustrates a top view of an example algal PU composite core. The core composite is comprised of alternating layers of algal derived PU and wood, which can vary in configuration and dimension. Configuration and dimensions of the composite can be optimized to confer specific structural and functional properties in the finished product. Example dimensions are shown in centimeters (cm).

FIG. 1, Panel C illustrates a cross-sectional view of FIG. 1, Panel B. In this example, wood and algal PU foam cores are milled to height of 16 mm (1.6 cm). Wood strips are 25-30 mm (2.5-3 cm) wide, depending upon their precise location, while algal PU foam strips are 15 mm (1.5 cm) wide. Example dimensions are shown in centimeters (cm).

The specific orientation and geometry of wood or algal foam material used can be optimized depending upon the desired performance characteristics one is trying to achieve.

The example composite includes seven laminated layers: two layers of algal PU (a), followed by a layer of wood (b), followed by a PU core (a'), a second layer of wood, and two additional layers of PU. Each of the layers are affixed together lengthwise.

FIG. 1, Panel D illustrates an example algal PU composite core outline.

FIG. 1, Panel E shows this outline overlaid onto a wood-algal PU core (top view).

Likewise, FIG. 1, Panel F illustrates a second example of an algal PU composite core outline.

FIG. 1, Panel G shows this outline overlaid onto a wood-algal PU core (top view).

FIG. 1, Panel H shows a profile view of the wood-algal PU foam cores shown in FIG. 1, Panels E and G.

FIG. 1, Panel I shows and idealized profile and top view of a snow ski indicating with dotted arrows the tip, waist, and tail regions of the assembled ski shown in cutaway view in FIG. 1, Panel A FIG. 1, Panel J shows the composition of the ski in cross section, including the algal core composite, at tip, waist and tail. Example dimensions are shown in millimeters (mm). The top layer is composed of a top sheet of plastic/thermoplastic (a), followed by two layers of fiberglass (b). The bottom layer is composed of a layer of fiberglass, followed by a bottom sheet. The bottom sheet is composed of polyethylene flanked on each side by edges composed of metal and elastomeric material. The width of each of the elastomer/metal edge components is 2.5 mm.

The tip has a height of 7 mm with a bottom width of 136 mm, which includes the seven-layer composite core with a width of 135 mm and two sidewalls, each having a width of 0.5 mm. The waist has a height of 16 mm. The waist has a bottom width of 110 mm, which includes the seven-layer composite core having a width of 105 mm and two sidewalls, each having a width of 2.5 mm. The tail has a height of 7 mm. The tail has a bottom width of 136 mm, which includes the seven-layer composite core having a width of 135 mm and two sidewalls, each having a width of 0.5 mm.

Figure 4:
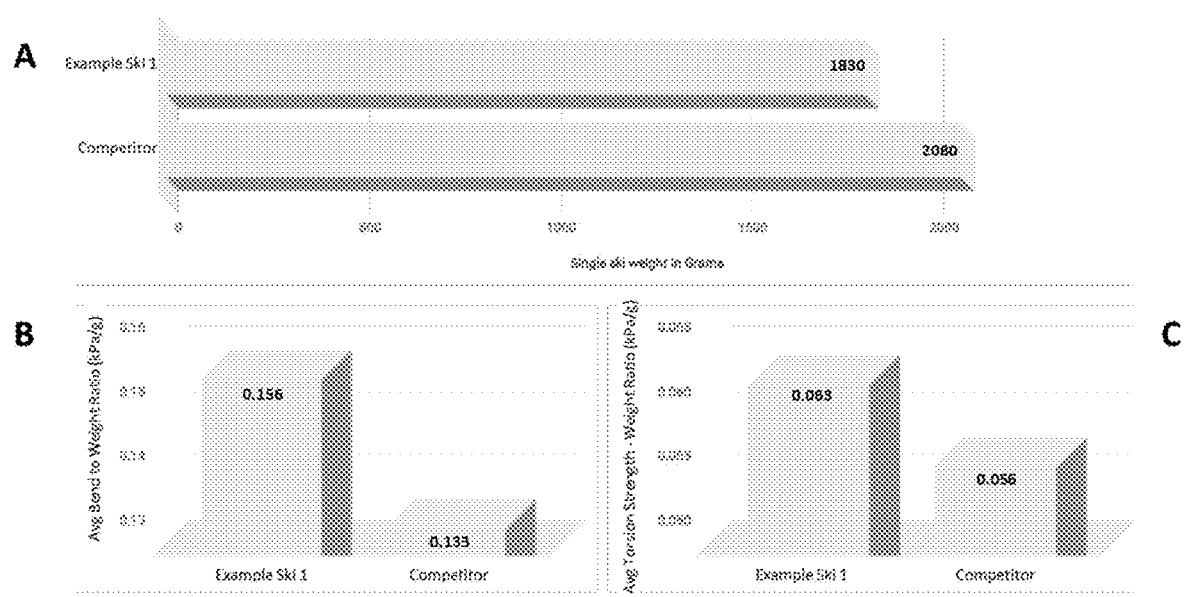
FIG. 4, Panel A illustrates functional comparisons of an example ski and a competitor ski. Panel B illustrates functional comparisons of an example ski and a competitor ski. Panel C illustrates functional comparisons of an example ski and a competitor ski.

Example 2. Comparison of an Example Ski Composed of Microbial Derived PU and an Average Competitor Ski FIG. 4 illustrates functional comparisons of an example ski described herein versus an average competitor ski having the same dimensions. FIG. 4, Panel A shows a mass (weight) comparison of an example ski composed of an algal derived PU composite (Example Ski 1) versus a competitor ski (Competitor). Example Ski 1 is about 250 grams lighter than the competitor ski. FIG. 4, Panel B shows average bend-to-weight ratio comparison of the example ski versus the competitor. Example Ski 1 exhibited an average bend-to-weight ratio of 0.156 kPa/g, whereas the competitor ski exhibited an average bend-to-weight ratio of 0.133 kPa/g. FIG. 4, Panel C shows average bend-to-weight ratio comparison of the example ski versus the competitor. Example Ski 1 exhibited an average torsion strength-to-weight ratio of 0.063 kPa/g, whereas the competitor ski exhibited an average torsion strength-to-weight ratio of 0.056 kPa/g.

Figure 5:
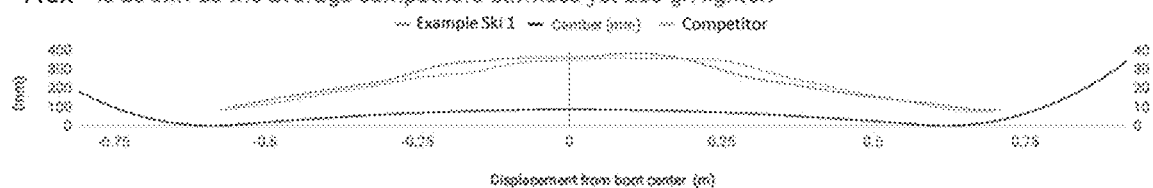
FIG. 5 illustrates functional comparisons of an example ski and a competitor ski.
Figure 5:
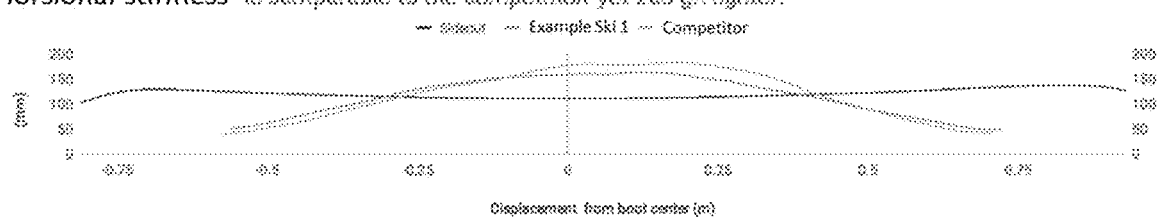

FIG. 5 illustrates functional comparisons of an example ski described herein versus an average competitor ski having the same dimensions. Despite being about 250 grams lighter than the competitor ski, Example Ski 1 exhibited similar flex and similar torsional stiffness properties as the competitor ski.

Example 3. PU Foam Compositions and Characterization Thereof

Four PU foam compositions were prepared from algal polyols using components and relative weights thereof as detailed in TABLE 2. The algal polyol was prepared from an epoxidized ethanol ring opened high oleic algal oil (>88% C18:1, OH #149, EW 376). JEFFOL® G30-650 Polyol (a propoxylated form of glycerol; glycerine initiated; OH #650; EW 86; MW 260; functionality 3.0; viscosity 880 cps@25° C.; specific gravity@25° C. 1.09), Rubinate® M (crude, polymeric MDI, functionality 2.7, % NCO 31.2%, EW 135), and JEFFCAT® ZF-20 (bis-(2-dimethylaminoethyl)ether; viscosity, cp @20° C.<4; density, g/ml 20/20° C. 0.85) were from Huntsman®. Glycerol and Dabco® 33-LV catalyst (MW 112.17 g/mol) were from Sigma Chemical Co. BiCAT® 8840 catalyst (9.5-10.5% bismuth; specific gravity@25° C. 1.05-1.25; viscosity@25° C. 300 Pse) was from Shepherd Chemical. TEGOSTAB® B 8871 (a polyether-modified polysiloxane copolymer; viscosity@25° C. 750±100 mPas; density@25° C. 1.02±0.02), was from Evonik®.

TABLE 2

| Component | Relative weight (%) | | | |
| --- | --- | --- | --- | --- |
| | LS-1 | LS-2 | LS-3 | LS-4 |
| Algal polyol | 33.8 | 20.9 | 36.9 | 43.1 |
| Glycerol | 8.5 | 6.4 | 4.1 | 4.8 |
| JEFFOL ® G30-650 | — | 4.8 | — | — |
| TEGOSTAB ® B 8871 | 0.6 | 0.5 | 0.8 | 0.9 |
| Water | 0.4 | 0.3 | 1.2 | 0.5 |
| BICAT ® 8840 | — | 0.2 | — | — |
| Dabco ® 33-LV | 0.6 | — | 0.08 | — |
| JEFFCAT ® ZF-20 | 0.6 | 0.2 | 0.2 | 0.5 |
| B-side Chemistry | 45 | 33 | 43 | 50 |
| Rubinate ® M (A-side Chemistry) | 55 | 67 | 57 | 50 |
| Total | 100 | 100 | 100 | 100 |

Figure 8:
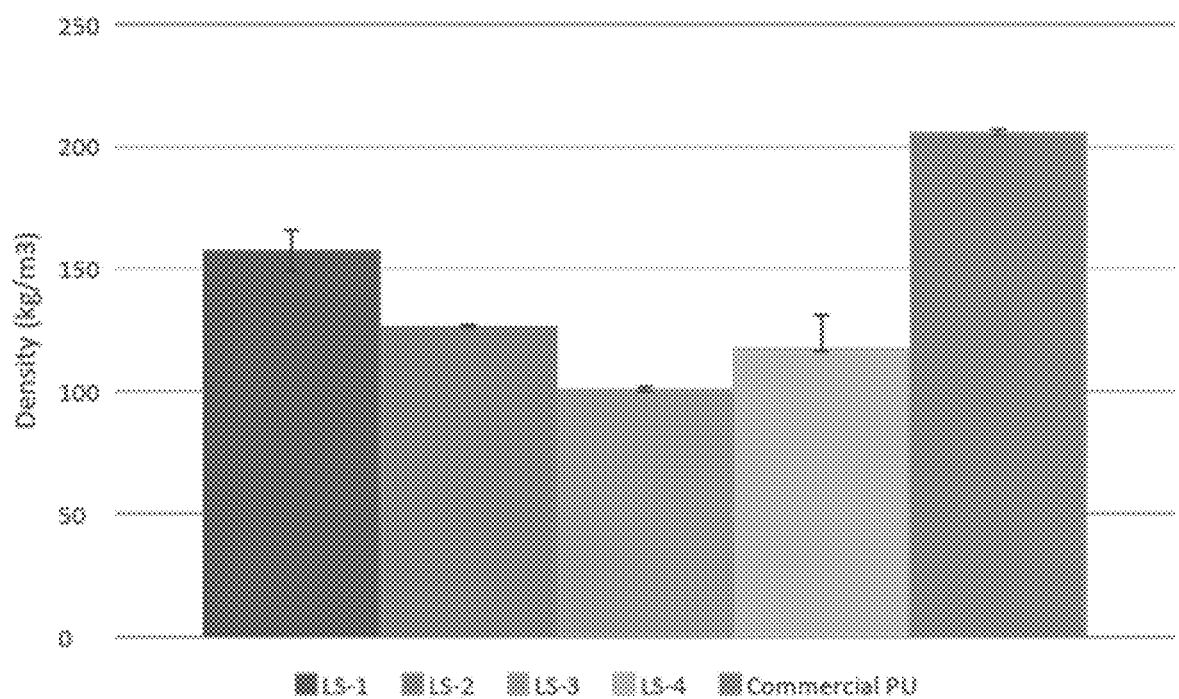
FIG. 8 summarizes the density of PU foams LS-1, LS-2, LS-3, and LS-4.
Figure 9:
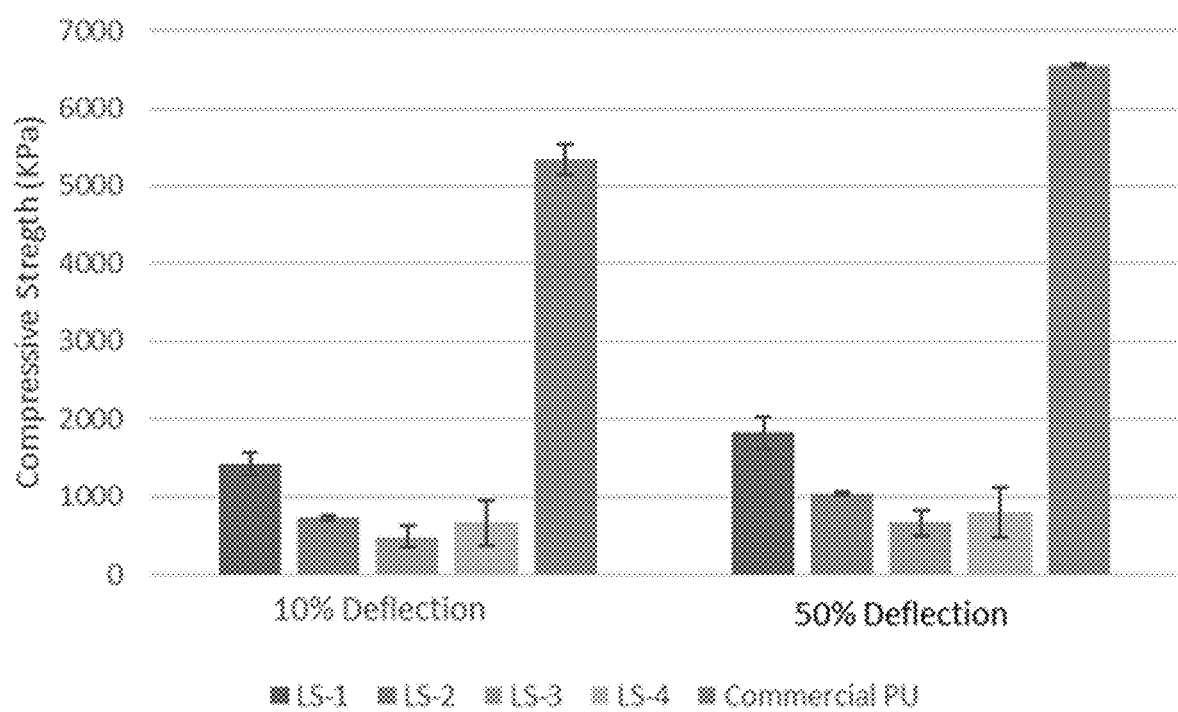
FIG. 9 summarizes the compressive strength as a function of deflection of PU foams LS-1, LS-2, LS-3, and LS-4 versus a commercial PU.
Figure 10:
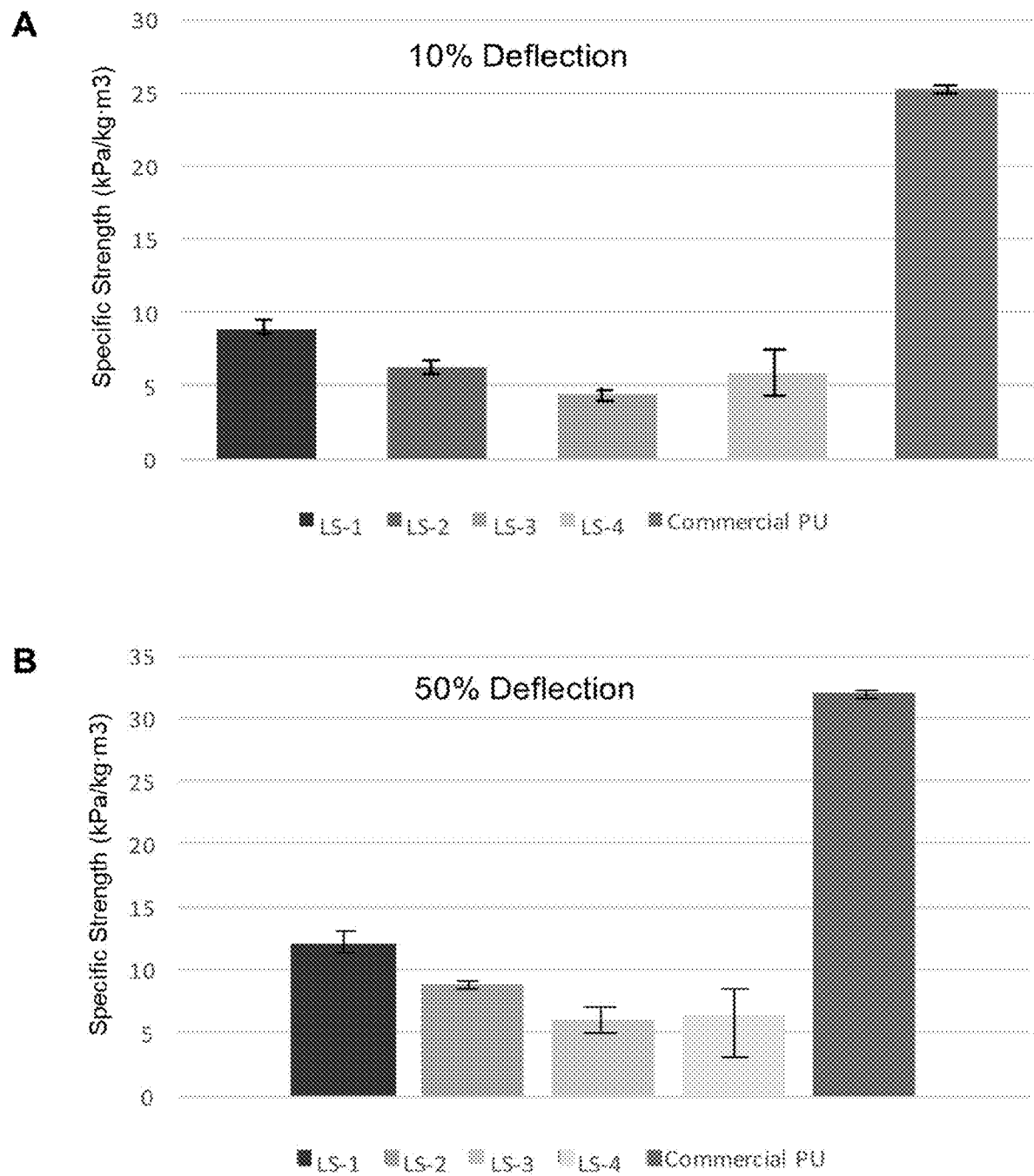
FIG. 10, Panel A summarizes the specific strength at 10% deflection of PU foams LS-1, LS-2, LS-3, and LS-4 versus a commercial PU. Panel B summarizes the specific strength at 50% deflection of PU foams LS-1, LS-2, LS-3, and LS-4 versus a commercial PU.

The foams were prepared as follows. After adequate mixing, of B-side chemistry, the A-side chemistry was added. All the components were mixed vigorously and then poured into a pre-heated (60° C.) square mold, pre-treated with mold release, configured with a single central vent port 6.4 mm in diameter and having dimensions of 152 mm (L)×152 mm (W)×56 mm (D). Foams were allowed to cure for 1 hour, after which time the resulting foam block was removed. Each of the foams (LS-1, LS-2, LS-3, and LS-4) was characterized for density, compressive strength (as a function of deformation at 10% or 50%), and specific strength (at 10% or 50% deformation), as shown in FIGS. 8-10, respectively. These properties of the foams are summarized in TABLE 3. A commercial PU foam (Divinycell H80, a PVC, polyurea-polyamide polymer; commercial PU) was used as a reference standard.

TABLE 3

| PU Foam | Density (kg/m³) | Compressive Strength at 10% Deflection (kPa) | Specific Strength at 10% Deflection (kPa/kg · m³) | Compressive Strength at 50% Deflection (kPa) | Specific Strength at 50% Deflection (kPa/kg · m³) |
| --- | --- | --- | --- | --- | --- |
| LS-1 | 154 | 1350 | 8.8 | 1850 | 12.0 |
| LS-2 | 124 | 775 | 6.3 | 1090 | 8.8 |
| LS-3 | 110 | 450 | 4.5 | 600 | 6.4 |
| LS-4 | 130 | 675 | 5.8 | 750 | 5.8 |

In addition to assessing the physical properties of the cast foam formulations, the physical properties of the foam in the context of their end use as part of a wood-foam composite material were assessed. Wood-foam composite layups were prepared as outlined in FIG. 6. Foam planks were prepared and sectioned to various widths (20, 15, or 10 mm, for example). Similarly, wood planks were prepared and sectioned to various widths, and then combined with the foam planks. In some cases, one or more species of wood were used. The wood foam composites were prepared through lamination of the materials using a PU based adhesive. After the composite layups were laminated and cured, test coupons of various thicknesses were prepared for subsequent materials testing.

Example 4. PU Foam-Wood Composite Compositions and Characterization Thereof

Selection of wood species for the generation of test coupons is also a significant area around which optimization of wood-foam composites is dependent. Wood species have evolved to resist compression that is parallel to the grain of the wood (e.g., trees exhibit tremendous capacity to bend and recover, even in hurricane force winds). Hence, wood used in construction displays great value when used as a simple beam. FIG. 7, Panel A illustrates a material (e.g., a wooden beam) subjected to three-point bend testing. Application of a load exerts a series of force vectors on the material including compression at the site of impact, shear along the neutral axis, and tension opposite the site of the load. FIG. 7, Panel B illustrates the wood-foam coupons (prepared as depicted in FIG. 6) subjected to three-point bend testing. TABLE 4 summarizes the physical properties of various wood types. The wood species display a wide range of specific strengths when subjected to three-point bend flexural testing as shown in FIG. 7, Panel A.

TABLE 4

| Wood Species | Density (kg/m³) | Strain at Break (%) | Stress at Break (MPa) | Specific Strength at Break (MPa/kg · m³) |
| --- | --- | --- | --- | --- |
| Aspen | 497 | 1.97 | 902 | 1.81 |
| Ash | 689 | 1.64 | 605 | 0.88 |
| Bamboo | 610 | 2.21 | 783 | 1.28 |
| Beech | 686 | 1.54 | 1127 | 1.64 |
| Birch | 618 | 1.21 | 568 | 0.92 |
| Hard Maple | 669 | 1.91 | 755 | 1.13 |
| Paulownia | 219 | 1.30 | 238 | 1.09 |
| Poplar | 455 | 1.51 | 581 | 1.27 |

Figure 11:
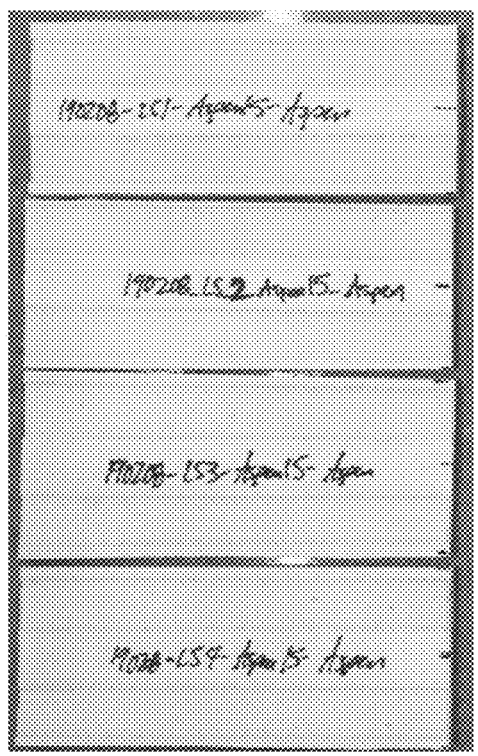
FIG. 11 illustrates coupons of aspen-foam composite layups using PU foams LS-1, LS-2, LS-3, and LS-4.

As outlined in FIG. 6, test coupons were prepared form a composite layup having two planks of PU foam (any one of LS-1, LS-2, LS-3, and LS-4; each 15 mm in width) alternately laminated with three planks of aspen wood (each 15 mm in width) with the aspen as the center stringer as shown in FIG. 11 (from top to bottom: LS-1, LS-2, LS-3, and LS-4).

Figure 12:
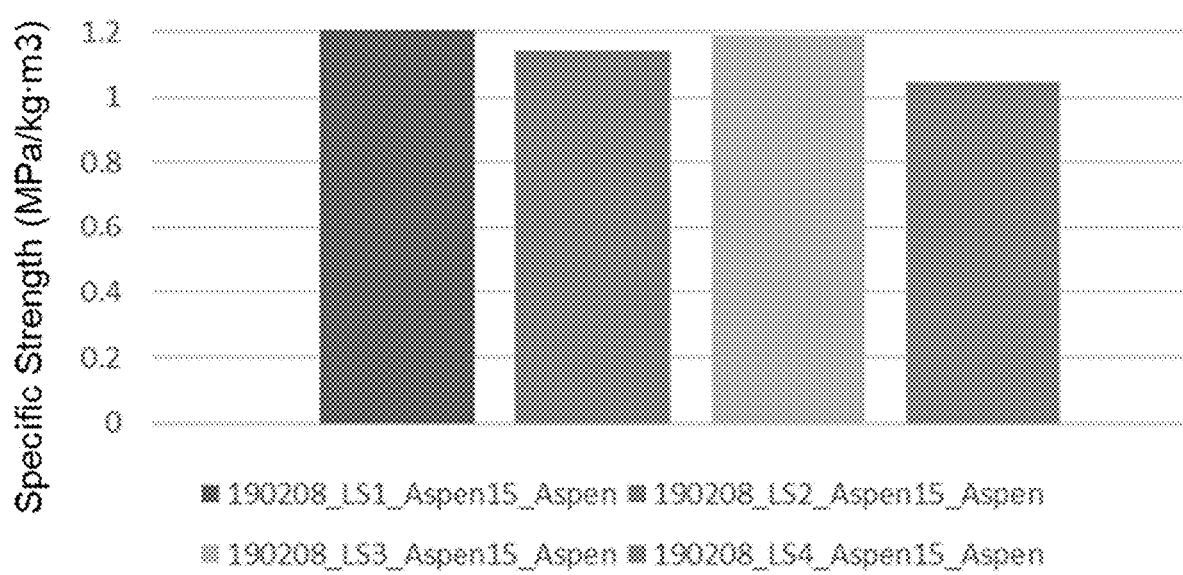
FIG. 12 summarizes the specific strength at yield of aspen-foam composite layups using PU foams LS-1, LS-2, LS-3, and LS-4.

The resulting wood-foam laminate was then sawn such that coupons possessed 4 mm outside aspen stringers, 15 mm internal foam strips, and a 15 mm central aspen stringer. These coupons were 6.2 mm thick. The coupons were characterized for specific strength by three-point bend flexural testing as illustrated in FIG. 7, Panel B and per ASTM D790. Specific strengths of the coupons are summarized in FIG. 12. The LS-1 and LS-3 coupons exhibited the highest specific strength.

Figure 13:
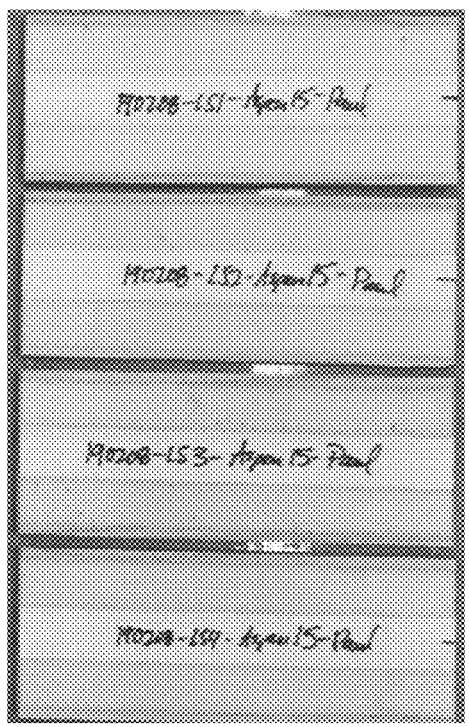
FIG. 13 illustrates coupons of aspen-*Paulownia*-foam composite layups using PU foams LS-1, LS-2, LS-3, and LS-4.
Figure 14:
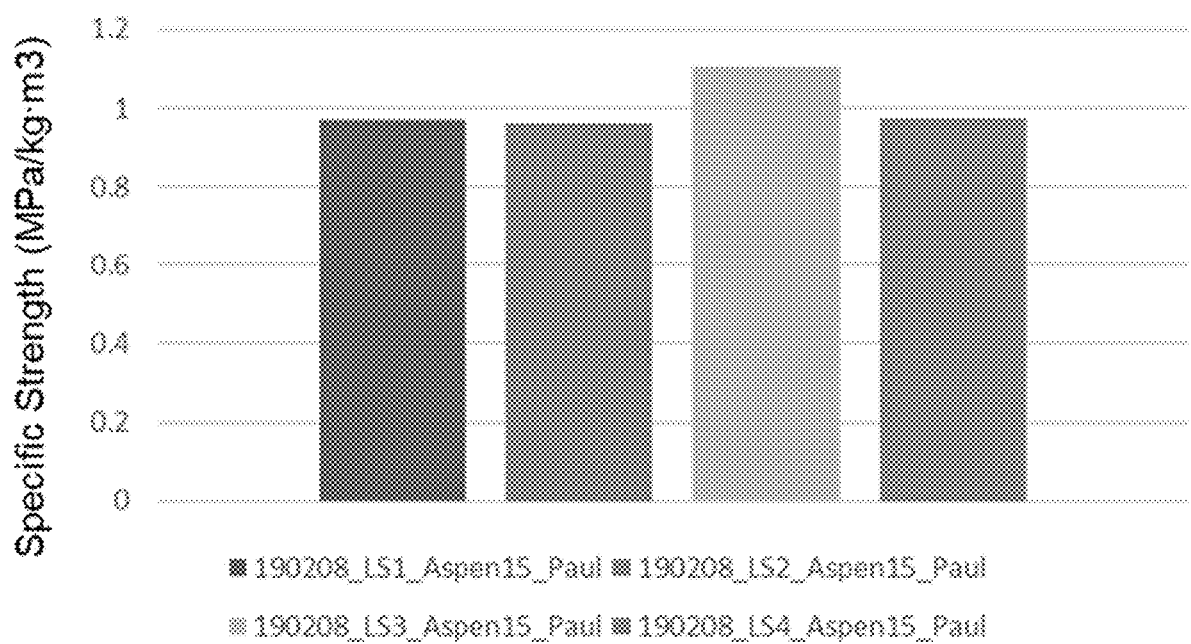
FIG. 14 summarizes the specific strength at yield of aspen-*Paulownia*-foam composite layups using PU foams LS-1, LS-2, LS-3, and LS-4.

As outlined in FIG. 6, test coupons were prepared form a composite layup having two planks of PU foam (any one of LS-1, LS-2, LS-3, and LS-4; each 15 mm in width) alternately laminated with two planks of *Paulownia* wood (each 15 mm in width) and one plank of aspen wood (15 mm in width) with the aspen as the center stringer as shown in FIG. 13 (from top to bottom: LS-1, LS-2, LS-3, and LS-4). The resulting wood-foam laminate was then sawn such that coupons possessed 4 mm outside *Paulownia* stringers, 15 mm internal foam strips, and a 15 mm central aspen stringer. These coupons were 6.2 mm thick. The coupons were characterized for specific strength by three-point bend flexural testing as illustrated in FIG. 7, Panel B and per ASTM D790. Specific strengths of the coupons are summarized in FIG. 14. The LS-3 coupon exhibited the highest specific strength.

Figure 15:
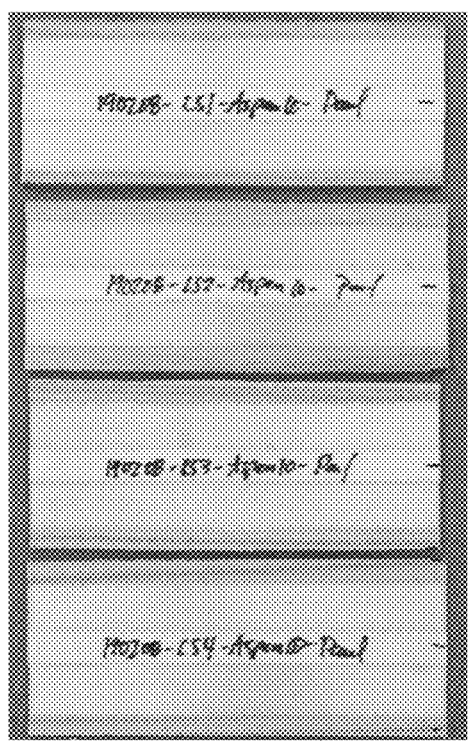
FIG. 15 illustrates coupons of aspen-*Paulownia*-foam composite layups using PU foams LS-1, LS-2, LS-3, and LS-4.
Figure 16:
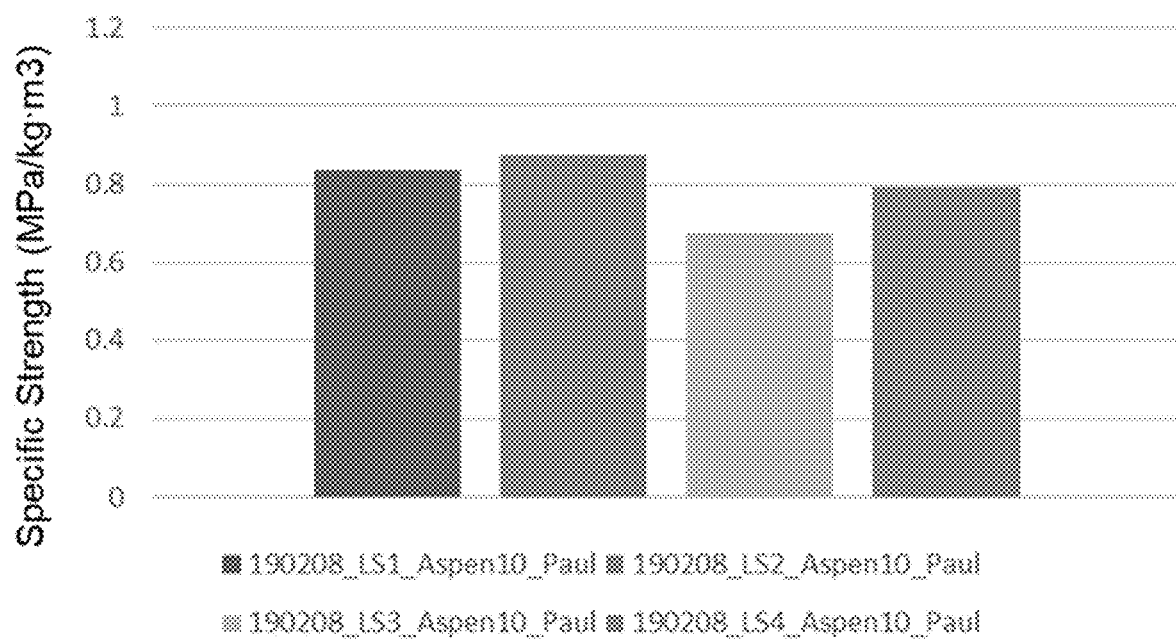
FIG. 16 summarizes the specific strength at yield of aspen-*Paulownia*-foam composite layups using PU foams LS-1, LS-2, LS-3, and LS-4.

As illustrated in FIG. 6, planks of PU foam were again laminated to planks of both aspen and *Paulownia* wood, except this time, the central aspen stringer was 10 mm in width as shown in FIG. 15 (from top to bottom: LS-1, LS-2, LS-3, and LS-4). The resulting wood-foam laminate was then sawn such that coupons possessed 4 mm outside *Paulownia* stringers, 15 mm internal foam strips, and a 10 mm central aspen stringer. These coupons were 6.2 mm thick. The coupons were again characterized for specific strength by three-point bend flexural testing as illustrated in FIG. 7, Panel B and per ASTM D790. Specific strengths of the coupons are summarized in FIG. 16. The LS-1 and LS-2 coupons exhibited the highest specific strength.

Figure 17:
FIG. 17 illustrates coupons of various wood-foam composite layups using PU foam LS-1.
Figure 18:
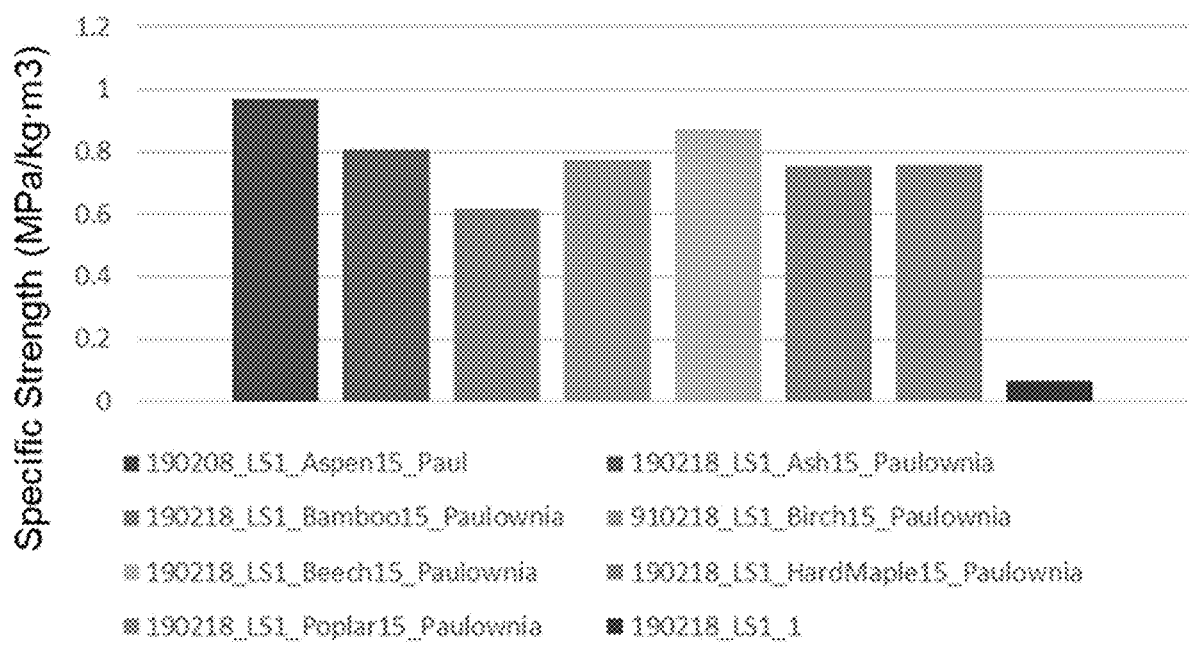
FIG. 18 summarizes the specific strength at yield of various wood-foam composite layups using PU foam LS-1.

To test the flexural contribution of the center wood stringer, coupons were prepared with 15 mm wide central stringers comprised of various wood species (aspen, ash, bamboo, beech, birch, poplar, and hard maple) flanked by 15 mm wide strips of LS-1 PU foam with *Paulownia* wood at the edge as shown in FIG. 17 (left from top to bottom: LS-1 Aspen 15 *Paulownia*, LS-1 Bamboo 15 *Paulownia*, LS-1 Birch 15 *Paulownia*, and LS-1; right from top to bottom: LS-1 Beech 15 *Paulownia*, LS-1 Poplar 15 *Paulownia*, LS-1 Hard Maple 15 *Paulownia*, and LS-1). The resulting wood-foam laminate was then sawn such that coupons possessed 4 mm outside *Paulownia* stringers, 15 mm internal foam strips, and a 15 mm central stringer comprised of one of eight wood species. These coupons were 6.2 mm thick. The coupons were again characterized for specific strength by three-point bend flexural testing as illustrated in FIG. 7, Panel B and per ASTM D790. Specific strengths of the coupons are summarized in FIG. 18 (from left to right: LS-1 Aspen 15 *Paulownia*, LS-1 Ash 15 *Paulownia*, LS-1 Bamboo 15 *Paulownia*, LS-1 Birch 15 *Paulownia*, LS-1 Beech 15 *Paulownia*, LS-1 Hard Maple 15 *Paulownia*, LS-1 Poplar 15 *Paulownia*, and LS-1). The aspen-*Paulownia* coupons exhibited the highest specific strength.

Properties of the resulting foam-wood composites are summarized in TABLE 5.

TABLE 5

| Wood-Foam Composite | Bulk Density (kg/m$^3$) | Stress at Yield (MPa) | Specific Strength at Yield (MPa/kg · m$^3$) |
|---|---|---|---|
| LS-1 Aspen 15 Aspen | 349 | 422 | 1.21 |
| LS-2 Aspen 15 Aspen | 278 | 316 | 1.14 |
| LS-3 Aspen 15 Aspen | 304 | 362 | 1.19 |
| LS-4 Aspen 15 Aspen | 292 | 306 | 1.05 |
| LS-1 Aspen 15 Paulownia | 266 | 259 | 0.97 |
| LS-2 Aspen 15 Paulownia | 268 | 258 | 0.96 |
| LS-3 Aspen 15 Paulownia | 256 | 283 | 1.11 |
| LS-4 Aspen 15 Paulownia | 259 | 252 | 0.97 |
| LS-1 Aspen 10 Paulownia | 218 | 181 | 0.83 |
| LS-2 Aspen 10 Paulownia | 255 | 223 | 0.88 |
| LS-3 Aspen 10 Paulownia | 272 | 184 | 0.68 |
| LS-4 Aspen 10 Paulownia | 229 | 182 | 0.80 |
| LS-1 Aspen 15 Paulownia | 266 | 245 | 0.97 |
| LS-1 Ash 15 Paulownia | 307 | 246 | 0.80 |
| LS-1 Bamboo 15 Paulownia | 285 | 174 | 0.61 |
| LS-1 Birch 15 Paulownia | 287 | 216 | 0.75 |
| LS-1 Beech 15 Paulownia | 307 | 261 | 0.85 |
| LS-1 Maple 15 Paulownia | 301 | 220 | 0.73 |
| LS-1 Poplar 15 Paulownia | 241 | 179 | 0.74 |
| LS-1 | 140 | 3.5 | 0.025 |

Example 5. Adhesion Testing of PU Foam-Wood Compositions

Figure 19:
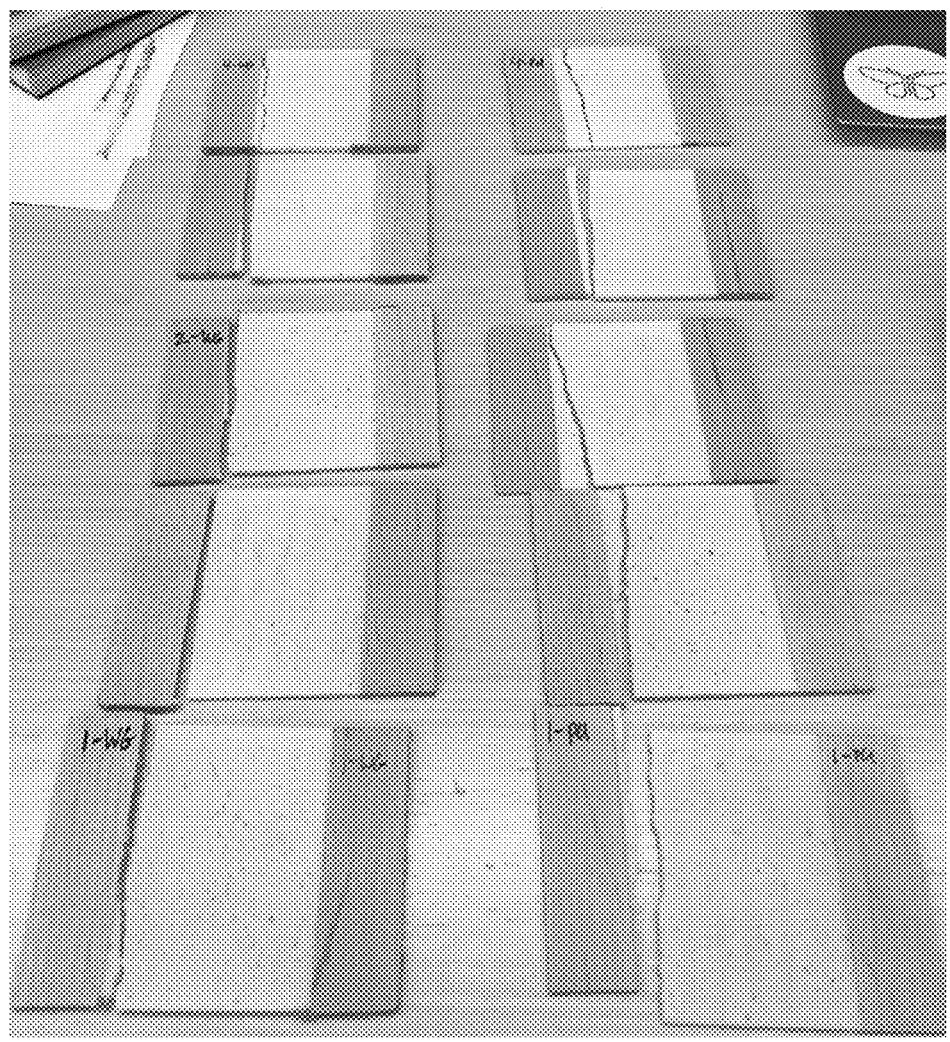
FIG. 19 illustrates results of adhesion testing of coupons laminated with wood glue versus PU glue.

The PU foam-wood coupons were further assessed for adhesion failure during core manufacturing. The coupons comprised strips of PU foam laminated to strips of *Paulownia* wood using either a commercial wood glue (Elmer's® comprising polyvinyl acetate, polyvinyl alcohol, and propylene glycol) or PU based glue (Gorilla Glue® comprising 40-70% polyisocyanate pre-polymer based on MDI, 10-30% polymeric diphenylmethane diisocyanate, 15-20% and diphenylmethane diisocyanate (MDI), mixed isomers, 1-5%). As shown in FIG. 19, the wood glue resulted in fractures along the bond line between the foam and wood, thereby suggesting adhesion failure (left). When wood glue was substituted with the PU based adhesive, fractures occurred away from the bond line, thereby mitigating adhesion failure (right).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EMBODIMENTS

Embodiment 1. A composition comprising: a polyurethane foam; and one or more species of wood, wherein the polyurethane foam is laminated to the one or more species of wood, wherein the composition has a specific strength at yield of about 0.5 MPa/kg·m$^3$ to about 2 MPa/kg·m$^3$.

Embodiment 2. The composition of embodiment 1, wherein the polyurethane foam has a density of from about 90 kg/m$^3$ to about 170 kg/m$^3$.

Embodiment 3. The composition of embodiment 1 or 2, wherein the polyurethane foam has a compressive strength at 10% deflection of from about 500 kPa to about 2000 kPa.

Embodiment 4. The composition of embodiment 1 or 2, wherein the polyurethane foam has a compressive strength at 10% deflection of from about 1000 kPa to about 2000 kPa.

Embodiment 5. The composition of any one of embodiments 1-4, wherein the polyurethane foam has a specific strength at 10% deflection of from about 5 kPa/kg·m$^3$ to about 20 kPa/kg·m$^3$.

Embodiment 6. The composition of any one of embodiments 1-4, wherein the polyurethane foam has a specific strength at 10% deflection of from about 10 kPa/kg·m$^3$ to about 15 kPa/kg·m$^3$.

Embodiment 7. The composition of any one of embodiments 1-6, wherein the one or more species of wood has a density of from about 100 kg/m$^3$ to about 600 kg/m$^3$.

Embodiment 8. The composition of any one of embodiments 1-6, wherein the one or more species of wood has a density of from about 200 kg/m$^3$ to about 500 kg/m$^3$.

Embodiment 9. The composition of any one of embodiments 1-8, wherein the one or more species of wood has a strain at break of from about 1% to about 5%.

Embodiment 10. The composition of any one of embodiments 1-8, wherein the one or more species of wood has a strain at break of from about 1% to about 3%.

Embodiment 11. The composition of any one of embodiments 1-10, wherein the one or more species of wood has a stress at break of from about 100 MPa to about 1500 MPa.

Embodiment 12. The composition of any one of embodiments 1-10, wherein the one or more species of wood has a stress at break of from about 200 MPa to about 1000 MPa.

Embodiment 13. The composition of any one of embodiments 1-12, wherein the one or more species of wood has a specific strength at break of from about 0.5 MPa/kg·m$^3$ to about 2 MPa/kg·m$^3$.

Embodiment 14. The composition of any one of embodiments 1-12, wherein the one or more species of wood has a specific strength at break of from about 1 MPa/kg·m$^3$ to about 2 MPa/kg·m$^3$.

Embodiment 15. The composition of any one of embodiments 1-14, wherein the composition has a bulk density of from about 200 kg/m$^3$ to about 400 kg/m$^3$.

Embodiment 16. The composition of any one of embodiments 1-14, wherein the composition has a bulk density of from about 250 kg/m$^3$ to about 400 kg/m$^3$.

Embodiment 17. The composition of any one of embodiments 1-16, wherein the composition has a stress at yield of from about 150 MPa to about 500 MPa.

Embodiment 18. The composition of any one of embodiments 1-16, wherein the composition has a stress at yield of from about 200 MPa to about 450 MPa.

Embodiment 19. The composition of any one of embodiments 1-18, wherein the composition has a specific strength at yield of from about 0.5 MPa/kg·m$^3$ to about 1.5 MPa/kg·m$^3$.

Embodiment 20. The composition of any one of embodiments 1-18, wherein the composition has a specific strength at yield of from about 0.9 MPa/kg·m$^3$ to about 1.5 MPa/kg·m$^3$.

Embodiment 21. The composition of embodiment 1, wherein the polyurethane foam has a density of from about 90 kg/m$^3$ to about 170 kg/m$^3$ and the one or more species of wood has a density of from about 100 kg/m$^3$ to about 600 kg/m$^3$.

Embodiment 22. The composition of embodiment 1, wherein the polyurethane foam has a compressive strength at 10% deflection of from about 500 kPa to about 2000 kPa and the one or more species of wood has a strain at break of from about 1% to about 5%.

Embodiment 23. The composition of embodiment 1, wherein the polyurethane foam has a compressive strength at 10% deflection of from about 500 kPa to about 2000 kPa and the one or more species of wood has a stress at break of from about 100 MPa to about 1500 MPa.

Embodiment 24. The composition of embodiment 1, wherein the polyurethane foam has a specific strength at 10% deflection of from about 5 kPa/kg·m$^3$ to about 20 kPa/kg·m$^3$ and the one or more species of wood has a specific strength at break of from about 0.5 MPa/kg·m$^3$ to about 2 MPa/kg·m$^3$.

Embodiment 25. The composition of embodiment 1, wherein the polyurethane foam has a density of from about 90 kg/m$^3$ to about 170 kg/m$^3$ and the composition has a bulk density of from about 200 kg/m$^3$ to about 400 kg/m$^3$.

Embodiment 26. The composition of embodiment 1, wherein the polyurethane foam has a compressive strength at 10% deflection of from about 500 kPa to about 2000 kPa and the composition has a stress at yield of from about 150 MPa to about 500 MPa.

Embodiment 27. The composition of embodiment 1, wherein the polyurethane foam has a specific strength at 10% deflection of from about 5 kPa/kg·m$^3$ to about 20 kPa/kg·m$^3$ and the composition has a specific strength at yield of from about 0.5 MPa/kg·m$^3$ to about 2 MPa/kg·m$^3$.

Embodiment 28. The composition of embodiment 1, wherein the one or more species of wood has a density of from about 100 kg/m$^3$ to about 600 kg/m$^3$ and the composition has a bulk density of from about 200 kg/m$^3$ to about 400 kg/m$^3$.

Embodiment 29. The composition of embodiment 1, wherein the one or more species of wood has a strain at break of from about 1% to about 5% and the composition has a stress at yield of from about 150 MPa to about 500 MPa.

Embodiment 30. The composition of embodiment 1, wherein the one or more species of wood has a stress at break of from about 100 MPa to about 1500 MPa and the composition has a stress at yield of from about 150 MPa to about 500 MPa.

Embodiment 31. The composition of embodiment 1, wherein the one or more species of wood has a specific strength at break of from about 0.5 MPa/kg·m$^3$ to about 2 MPa/kg·m$^3$ and the composition has a specific strength at yield of from about 0.5 MPa/kg·m$^3$ to about 2 MPa/kg·m$^3$.

Embodiment 32. The composition of any one of embodiments 1-31, wherein the composition comprises alternating layers of the polyurethane foam and the one or more species of wood.

Embodiment 33. The composition of any one of embodiments 1-32, wherein the polyurethane foam is laminated to the one or more species of wood using a polyurethane based adhesive.

Embodiment 34. The composition of any one of embodiments 1-32, wherein the polyurethane foam is laminated to the one or more species of wood using a polyvinyl acetate based adhesive.

Embodiment 35. The composition of any one of embodiments 1-34, wherein the polyurethane foam is derived from a microbial oil polyol.

Embodiment 36. The composition of any one of embodiments 1-34, wherein the polyurethane foam is derived from an algal oil polyol.

Embodiment 37. The composition of any one of embodiments 1-34, wherein the polyurethane foam is derived from a plant oil polyol.

Embodiment 38. The composition of any one of embodiments 1-34, wherein the polyurethane foam is derived from a seed oil polyol.

Embodiment 39. The composition of any one of embodiments 1-38, wherein the polyurethane foam has a bio-based carbon content of 40% or more.

Embodiment 40. The composition of any one of embodiments 1-38, wherein the polyurethane foam has a bio-based carbon content of about 42%.

Embodiment 41. The composition of any one of embodiments 1-40, wherein the one or more species of wood is *Paulownia*.

Embodiment 42. The composition of any one of embodiments 1-40, wherein the one or more species of wood is aspen.

Embodiment 43. The composition of any one of embodiments 1-40, wherein the one or more species of wood is *Paulownia* and aspen.

Embodiment 44. The composition of embodiment 43, wherein the composition is a laminate having a first layer of *Paulownia* laminated to a first layer of the polyurethane foam, wherein the first layer of the polyurethane foam is laminated to a layer of aspen, wherein the layer of aspen is laminated to a second layer of the polyurethane foam, wherein the second layer of the polyurethane foam is laminated to a second layer of *Paulownia*.

Embodiment 45. The composition of any one of embodiments 1-44, wherein the composition is a core component of a sporting goods equipment.

Embodiment 46. The composition of embodiment 45, wherein the sporting goods equipment is a ski or a snowboard.

Embodiment 47. A composition comprising: a polyurethane foam; one or more species of wood; and a polyurethane based adhesive, wherein the polyurethane foam is laminated to the one or more species of wood using the polyurethane based adhesive.

Embodiment 48. The composition of embodiment 47, wherein the polyurethane foam has a density of from about 90 kg/m$^3$ to about 170 kg/m$^3$.

Embodiment 49. The composition of embodiment 47 or 48, wherein the polyurethane foam has a compressive strength at 10% deflection of from about 500 kPa to about 2000 kPa.

Embodiment 50. The composition of embodiment 47 or 48, wherein the polyurethane foam has a compressive strength at 10% deflection of from about 1000 kPa to about 2000 kPa.

Embodiment 51. The composition of any one of embodiments 47-50, wherein the polyurethane foam has a specific strength at 10% deflection of from about 5 kPa/kg·m$^3$ to about 20 kPa/kg·m$^3$.

Embodiment 52. The composition of any one of embodiments 47-50, wherein the polyurethane foam has a specific strength at 10% deflection of from about 10 kPa/kg·m$^3$ to about 15 kPa/kg·m$^3$.

Embodiment 53. The composition of any one of embodiments 47-52, wherein the one or more species of wood has a density of from about 100 kg/m$^3$ to about 600 kg/m$^3$.

Embodiment 54. The composition of any one of embodiments 47-52, wherein the one or more species of wood has a density of from about 200 kg/m$^3$ to about 500 kg/m$^3$.

Embodiment 55. The composition of any one of embodiments 47-54, wherein the one or more species of wood has a strain at break of from about 1% to about 5%.

Embodiment 56. The composition of any one of embodiments 47-54, wherein the one or more species of wood has a strain at break of from about 1% to about 3%.

Embodiment 57. The composition of any one of embodiments 47-56, wherein the one or more species of wood has a stress at break of from about 100 MPa to about 1500 MPa.

Embodiment 58. The composition of any one of embodiments 47-56, wherein the one or more species of wood has a stress at break of from about 200 MPa to about 1000 MPa.

Embodiment 59. The composition of any one of embodiments 47-58, wherein the one or more species of wood has a specific strength at break of from about 0.5 MPa/kg·m$^3$ to about 2 MPa/kg·m$^3$.

Embodiment 60. The composition of any one of embodiments 47-58, wherein the one or more species of wood has a specific strength at break of from about 1 MPa/kg·m$^3$ to about 2 MPa/kg·m$^3$.

Embodiment 61. The composition of any one of embodiments 47-60, wherein the composition has a bulk density of from about 200 kg/m$^3$ to about 400 kg/m$^3$.

Embodiment 62. The composition of any one of embodiments 47-60, wherein the composition has a bulk density of from about 250 kg/m$^3$ to about 400 kg/m$^3$.

Embodiment 63. The composition of any one of embodiments 47-62, wherein the composition has a stress at yield of from about 150 MPa to about 500 MPa.

Embodiment 64. The composition of any one of embodiments 47-62, wherein the composition has a stress at yield of from about 200 MPa to about 450 MPa.

Embodiment 65. The composition of any one of embodiments 47-64, wherein the composition has a specific strength at yield of from about 0.5 MPa/kg·m$^3$ to about 2 MPa/kg·m$^3$.

Embodiment 66. The composition of any one of embodiments 47-64, wherein the composition has a specific strength at yield of from about 0.9 MPa/kg·m$^3$ to about 1.5 MPa/kg·m$^3$.

Embodiment 67. The composition of embodiment 47, wherein the polyurethane foam has a density of from about 90 kg/m$^3$ to about 170 kg/m$^3$ and the one or more species of wood has a density of from about 100 kg/m$^3$ to about 600 kg/m$^3$.

Embodiment 68. The composition of embodiment 47, wherein the polyurethane foam has a compressive strength at 10% deflection of from about 500 kPa to about 2000 kPa and the one or more species of wood has a strain at break of from about 1% to about 5%.

Embodiment 69. The composition of embodiment 47, wherein the polyurethane foam has a compressive strength at 10% deflection of from about 500 kPa to about 2000 kPa and the one or more species of wood has a stress at break of from about 100 MPa to about 1500 MPa.

Embodiment 70. The composition of embodiment 47, wherein the polyurethane foam has a specific strength at 10% deflection of from about 5 kPa/kg·m$^3$ to about 20 kPa/kg·m$^3$ and the one or more species of wood has a specific strength at break of from about 0.5 MPa/kg·m$^3$ to about 2 MPa/kg·m$^3$.

Embodiment 71. The composition of embodiment 47, wherein the polyurethane foam has a density of from about 90 kg/m$^3$ to about 170 kg/m$^3$ and the composition has a bulk density of from about 200 kg/m$^3$ to about 400 kg/m$^3$.

Embodiment 72. The composition of embodiment 47, wherein the polyurethane foam has a compressive strength at 10% deflection of from about 500 kPa to about 2000 kPa and the composition has a stress at yield of from about 150 MPa to about 500 MPa.

Embodiment 73. The composition of embodiment 47, wherein the polyurethane foam has a specific strength at 10% deflection of from about 5 kPa/kg·m³ to about 20 kPa/kg·m³ and the composition has a specific strength at yield of from about 0.5 MPa/kg·m³ to about 2 MPa/kg·m³.

Embodiment 74. The composition of embodiment 47, wherein the one or more species of wood has a density of from about 100 kg/m³ to about 600 kg/m³ and the composition has a bulk density of from about 200 kg/m³ to about 400 kg/m³.

Embodiment 75. The composition of embodiment 47, wherein the one or more species of wood has a strain at break of from about 1% to about 5% and the composition has a stress at yield of from about 150 MPa to about 500 MPa.

Embodiment 76. The composition of embodiment 47, wherein the one or more species of wood has a stress at break of from about 100 MPa to about 1500 MPa and the composition has a stress at yield of from about 150 MPa to about 500 MPa.

Embodiment 77. The composition of embodiment 47, wherein the one or more species of wood has a specific strength at break of from about 0.5 MPa/kg·m³ to about 2 MPa/kg·m³ and the composition has a specific strength at yield of from about 0.5 MPa/kg·m³ to about 2 MPa/kg·m³.

Embodiment 78. The composition of any one of embodiments 47-77, wherein the polyurethane foam is derived from a microbial oil polyol.

Embodiment 79. The composition of any one of embodiments 47-77, wherein the polyurethane foam is derived from an algal oil polyol.

Embodiment 80. The composition of any one of embodiments 47-77, wherein the polyurethane foam is derived from a plant oil polyol.

Embodiment 81. The composition of any one of embodiments 47-77, wherein the polyurethane foam is derived from a seed oil polyol.

Embodiment 82. The composition of any one of embodiments 47-81, wherein the polyurethane foam has a bio-based carbon content of 40% or more.

Embodiment 83. The composition of any one of embodiments 47-81, wherein the polyurethane foam has a bio-based carbon content of about 42%.

Embodiment 84. The composition of any one of embodiments 47-83, wherein the one or more species of wood is *Paulownia*.

Embodiment 85. The composition of any one of embodiments 47-83, wherein the one or more species of wood is aspen.

Embodiment 86. The composition of any one of embodiments 47-83, wherein the one or more species of wood is *Paulownia* and aspen.

Embodiment 87. The composition of embodiment 86, wherein the composition is a laminate having a first layer of *Paulownia* laminated to a first layer of the polyurethane foam, wherein the first layer of the polyurethane foam is laminated to a layer of aspen, wherein the layer of aspen is laminated to a second layer of the polyurethane foam, wherein the second layer of the polyurethane foam is laminated to a second layer of *Paulownia*.

Embodiment 88. The composition of any one of embodiments 47-87, wherein the composition is a core component of a sporting goods equipment.

Embodiment 89. The composition of embodiment 88, wherein the sporting goods equipment is a ski or a snowboard.

What is claimed is:

1. An elongate composite article comprising:
    a plurality of elongate polyurethane foam layers;
    a plurality of elongate wood layers, wherein each elongate polyurethane foam layer of the plurality of elongate polyurethane foam layers is longitudinally layered between and affixed to one or more elongate wood layers of the plurality of elongate wood layers,
    an upper surface formed from both the plurality of elongate polyurethane foam layers and the plurality of elongate wood layers; and
    a lower surface formed from both the plurality of elongate polyurethane foam layers and the plurality of elongate wood layers, wherein a distance between the upper surface and the lower surface is less than 20 mm,
    wherein the article has a specific strength at yield of about 0.5 MPa/kg·m³ to about 2 MPa/kg·m³ as assessed by three-point bend flexural testing, wherein a load is applied downward to the upper surface of the article.

2. The article of claim 1, wherein each elongate polyurethane foam layer has a density of from about 90 kg/m³ to about 170 kg/m³.

3. The article of claim 1, wherein each elongate polyurethane foam layer has a compressive strength at 10% deflection of from about 500 kPa to about 2000 kPa.

4. The article of claim 1, wherein each elongate polyurethane foam layer has a compressive strength at 10% deflection of from about 1000 kPa to about 2000 kPa.

5. The article of claim 1, wherein each elongate polyurethane foam layer has a specific strength at 10% deflection of from about 5 kPa/kg·m³ to about 20 kPa/kg·m³.

6. The article of claim 1, wherein each elongate polyurethane foam layer has a specific strength at 10% deflection of from about 10 kPa/kg·m³ to about 15 kPa/kg·m³.

7. The article of claim 1, wherein the article has a bulk density of from about 200 kg/m³ to about 400 kg/m³.

8. The article of claim 1, wherein the article has a bulk density of from about 250 kg/m³ to about 400 kg/m³.

9. The article of claim 1, wherein the article has a stress at yield of from about 150 MPa to about 500 MPa.

10. The article of claim 1, wherein the article has a stress at yield of from about 200 MPa to about 450 MPa.

11. The article of claim 1, wherein the article has a specific strength at yield of from about 0.5 MPa/kg·m³ to about 1.5 MPa/kg·m³.

12. The article of claim 1, wherein the article has a specific strength at yield of from about 0.9 MPa/kg·m³ to about 1.5 MPa/kg·m³.

13. The article of claim 1, wherein each elongate polyurethane foam layer of the plurality of elongate polyurethane foam layers is affixed to the one or more elongate wood layers of the plurality of elongate wood layers by a polyurethane based adhesive.

14. The article of claim 1, wherein each elongate polyurethane foam layer of the plurality of elongate polyurethane foam layers is affixed to the one or more elongate wood layers of the plurality of elongate wood layers by a polyvinyl acetate based adhesive.

15. The article of claim 1, wherein each elongate polyurethane foam layer of the plurality of elongate polyurethane foam layers is derived from a microbial oil polyol.

16. The article of claim 1, wherein each elongate polyurethane foam layer of the plurality of elongate polyurethane foam layers is derived from an algal oil polyol.

17. The article of claim 1, wherein each elongate polyurethane foam layer of the plurality of elongate polyurethane foam layers has a bio-based carbon content of 40% or more.

18. The article of claim 1, wherein a first elongate wood layer of the plurality of elongate wood layers is comprised of *paulownia*.

19. The article of claim 18, wherein a second elongate wood layer of the plurality of elongate wood layers is comprised of aspen.

20. The article of claim 1, wherein a first elongate wood layer of the plurality of elongate wood layers is comprised of aspen.

21. The article of claim 1, wherein the composition is a core component of a sporting goods equipment.

22. The article of claim 21, wherein the sporting goods equipment is a ski or a snowboard.

\* \* \* \* \*